(12) United States Patent
Lee et al.

(10) Patent No.: US 12,511,528 B2
(45) Date of Patent: Dec. 30, 2025

(54) NEURAL NETWORK METHOD AND APPARATUS

(71) Applicant: Samsung Electronics Co., Ltd., Suwon-si (KR)

(72) Inventors: Junhaeng Lee, Hwaseong-si (KR); Hyunsun Park, Seoul (KR); Joonho Song, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1179 days.

(21) Appl. No.: 16/249,279

(22) Filed: Jan. 16, 2019

(65) Prior Publication Data

US 2020/0012936 A1    Jan. 9, 2020

(30) Foreign Application Priority Data

Jul. 4, 2018    (KR) .......................... 10-2018-0077894

(51) Int. Cl.
*G06N 3/08*    (2023.01)
*G06N 3/04*    (2023.01)

(52) U.S. Cl.
CPC ................. *G06N 3/08* (2013.01); *G06N 3/04* (2013.01)

(58) Field of Classification Search
CPC .................................... G06N 3/08; G06N 3/04
See application file for complete search history.

(56) References Cited

U.S. PATENT DOCUMENTS

| | | |
|---|---|---|
| 5,333,239 A | 7/1994 | Watanabe et al. |
| 5,857,178 A | 1/1999 | Kimura et al. |
| 5,859,930 A * | 1/1999 | Chase ................. G06K 9/00288 382/218 |
| 6,775,619 B2 | 8/2004 | Nyland |
| 10,152,676 B1 * | 12/2018 | Strom ..................... G06N 20/00 |
| 2016/0307199 A1 * | 10/2016 | Patel ....................... G06Q 20/32 |

(Continued)

FOREIGN PATENT DOCUMENTS

| | | |
|---|---|---|
| CN | 1470000 A | 1/2004 |
| CN | 105160249 A | 12/2015 |

(Continued)

OTHER PUBLICATIONS

Chen et al ("AdaComp: Adaptive Residual Gradient Compression for Data-Parallel Distributed Training." arXiv preprint arXiv:1712.02679 (2017)). (Year: 2017).*

(Continued)

*Primary Examiner* — Michelle T Bechtold
*Assistant Examiner* — Moriam Mosunmola Godo
(74) *Attorney, Agent, or Firm* — NSIP Law

(57) ABSTRACT

A neural network method and apparatus are provided. A processor implemented neural network includes calculating respective individual gradient values for updating a weight of a neural network, calculating a residual gradient value based on an accumulated gradient value obtained by accumulating the individual gradient values and a bit digit representing the weight, tuning the respective individual gradient values to correspond to a bit digit of the residual gradient value, summing the tuned respective individual gradient values, the residual gradient value, and the weight, and updating the weight and the residual gradient value based on a result of the summing to train the neural network.

21 Claims, 15 Drawing Sheets

(56) References Cited

U.S. PATENT DOCUMENTS

| | | | |
|---|---|---|---|
| 2016/0328645 A1* | 11/2016 | Lin | G06N 3/063 |
| 2017/0270408 A1 | 9/2017 | Shi et al. | |
| 2017/0316307 A1* | 11/2017 | Koster | G06F 7/00 |
| 2018/0075347 A1* | 3/2018 | Alistarh | G06N 3/084 |
| 2018/0107925 A1 | 4/2018 | Choi et al. | |
| 2019/0042945 A1* | 2/2019 | Majumdar | G06N 3/063 |
| 2019/0122106 A1 | 4/2019 | Lee et al. | |
| 2019/0130274 A1 | 5/2019 | Guo et al. | |
| 2020/0134451 A1* | 4/2020 | Baker | G06N 3/08 |

FOREIGN PATENT DOCUMENTS

| | | | |
|---|---|---|---|
| CN | 106297774 A | | 1/2017 |
| CN | 106796668 A | | 5/2017 |
| CN | 107480770 A | | 12/2017 |
| CN | 107797962 A | | 3/2018 |
| EP | 1 308 835 A2 | | 5/2003 |
| JP | 7-84975 A | | 3/1995 |
| JP | 3236635 B2 | | 12/2001 |
| JP | 3345478 B2 | | 11/2002 |
| WO | WO2017129325 | * | 8/2017 |
| WO | WO 2017/177446 A1 | | 10/2017 |

OTHER PUBLICATIONS

Strom et al ("Scalable distributed DNN training using commodity GPU cloud computing." Sixteenth Annual Conference of the International Speech Communication Association. 2015.) (Year: 2015).*

Pleiss et al. ("Memory-efficient implementation of densenets." arXiv preprint arXiv:1707.06990 (2017).) (Year: 2017).*

Digital neural network implementation, Eleventh Annual International Phoenix Conference on Computers and Communication [1992 Conference Proceedings], 1992, pp. 722-728, doi: 10.1109/PCCC.1992.200512 (Year: 1992).*

Extended European Search Report issued Aug. 28, 2020 in counterpart European Patent Application No. 19 157 353.4 (16 pages in English).

Zhou, S. et al., "DoReFa-Net: Training Low Bitwidth Convolutional Neural Networks with Low Bitwidth Gradients," arXiv:1606.06160v3, Feb. 2018, pp. 1-13 (13 pages in English).

Courbariaux et al., "Training Deep Neural Networks with Low Precision Multiplications," arXiv:1412.7024v5, Sep. 2015, pp. 1-10 (10 pages in English).

Strom, N. "Scalable Distributed DNN Training Using Commodity GPU Cloud Computing", *Sixteenth Annual Conference of the International Speech Communication Association*, 2015, pp. 1-6 (6 pages in English).

Dryden, N et al., "Communication Quantization for Data-Parallel Training of Deep Neural Networks", *2nd Workshop on Machine Learning in HPC Environments*, 2016, pp. 1-8 (8 pages in English).

Extended European Search Report issued on Aug. 8, 2019 in corresponding European Patent Application No. 19157353.4, pp. 1-10 (10 pages in English).

Chen, Chia-Yu, et al. "AdaComp: Adaptive Residual Gradient Compression for Data-Parallel Distributed Training." Proceedings of the AAAI conference on artificial intelligence. vol. 32. No. 1. 2018, (9 pages).

Chinese Office Action issued on Sep. 11, 2023, in counterpart Chinese Patent Application No. 201910558887.9 (9 pages in English, 8 pages in Chinese).

* cited by examiner

NEURAL NETWORK METHOD AND APPARATUS

CROSS-REFERENCE TO RELATED APPLICATION

This application claims the benefit under 35 USC § 119(a) of Korean Patent Application No. 10-2018-0077894, filed on Jul. 4, 2018, in the Korean Intellectual Property Office, the entire disclosure of which is incorporated herein by reference for all purposes.

BACKGROUND

1. Field

The present disclosure relates to a neural network method and an apparatus.

2. Description of the Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, categorization, or classification in various forms. The trained capability of extracting such information or recognitions, generating such mappings, performing such pattern recognitions, or performing such categorizations or classifications may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computational architectures, and in different automated manners than they would have been performed in non-computer implemented or non-automated approaches, they also invite problems or drawbacks that only occur because of the automated and specialized computational architecture manner in which they are implemented.

Such neural network implementations also require many operations for complex input data, which may require large power consumption and require long processing times. Further, attempts to reduce such processing requirements that are implemented result in degradations in accuracy and precision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes calculating respective individual gradient values to update a weight of a neural network, calculating a residual gradient value based on an accumulated gradient value obtained by accumulating the respective individual gradient values and a bit digit representing the weight, tuning the respective individual gradient values to correspond to a bit digit of the residual gradient value, summing the tuned individual gradient values, the residual gradient value, and the weight, and updating the weight and the residual gradient value based on a result of the summing to train the neural network.

The method may include determining a value of the accumulated gradient value summable to the bit digit representing the weight as an effective gradient value, and calculating the residual gradient value by subtracting the effective gradient value from the accumulated gradient value.

The method may include quantizing the respective individual gradient values, wherein a value of an individual gradient value less than a least significant bit digit of the residual gradient value is omitted, and padding the quantized respective individual gradient values, wherein a value up to a bit digit corresponding to a most significant bit digit of the residual gradient value is present.

The method may include mapping the tuned individual gradient values and the residual gradient value for the summing based on a set bit number and calculating an intermediate summation value, and mapping the weight based on the bit number and summing the intermediate summation value and the weight.

The method may include padding the tuned individual gradient values, the residual gradient value, and the weight, wherein a value is mapped to all bit digits, and summing the padded individual gradient values, the padded intermediate summation value, and the padded weight.

The method may include updating a bit digit value of the result of the summing corresponding to the bit digit representing the weight to the updated weight, and updating a bit digit value of the result of the summing not corresponding to the bit digit representing the weight to the residual gradient value.

The method may include obtaining a sign bit that is a Most Significant Bit of the result of the summing, and adding the obtained sign bit such that the obtained sign bit is a Most Significant Bit of one of the updated weight and/or the updated residual gradient value.

In one general aspect, a neural network processor implemented method includes calculating respective individual gradient values for updating a weight of the neural network, calculating respective residual gradient values based on an accumulated gradient value obtained by accumulating the respective individual gradient values and a bit digit representing the weight, tuning the respective individual gradient values to correspond to a bit digit representing the residual gradient value, concatenating a remaining value of the residual gradient value excluding a sign bit to the weight and calculating an intermediate concatenation value, summing the tuned respective individual gradient values and the residual gradient value, and updating the weight and the residual gradient value based on a result of the summing to train the neural network.

The method may include determining a value of the accumulated gradient value summable to the bit digit representing the weight as an effective gradient value, and calculating the residual gradient value by subtracting the effective gradient value from the accumulated gradient value.

The method may include quantizing the respective individual gradient values, wherein a value of the individual gradient value less than a least significant bit digit of the residual gradient value is omitted, and padding the quantized individual gradient value, wherein a value up to a bit digit corresponding to a most significant bit digit representing the residual gradient value is present.

The method may include mapping the tuned respective individual gradient values and the intermediate concatenation value based on a bit number and summing the tuned respective individual gradient values and the intermediate concatenation value.

In one general aspect, a non-transitory computer-readable recording medium has recorded thereon computer readable instructions, which, when executed by one or more processors, causes the one or more processors to perform any one of the methods described above.

The method may include padding the tuned respective individual gradient values and intermediate concatenation value, wherein a value is mapped to all bit digits, and summing the padded tuned respective individual gradient values and the padded intermediate concatenation value.

The method may include updating a bit digit value of the result of the summing corresponding to the bit digit representing the weight to the updated weight and updating a bit digit value of the result of the summing not corresponding to the bit digit representing the weight to the residual gradient value.

The method may include obtaining a sign bit that is a Most Significant Bit of the result of the summing and adding the obtained sign bit such that the obtained sign bit is a Most Significant Bit of the updated weight and/or the updated residual gradient value.

In one general aspect, a neural network apparatus includes one or more processors configured to calculate respective individual gradient values to update a weight of a neural network, calculate a residual gradient value based on an accumulated gradient value obtained by accumulating the respective individual gradient values and a bit digit representing the weight, tune the respective individual gradient values to correspond to a bit digit representing the residual gradient value, sum the tuned individual gradient values, the residual gradient value, and the weight, and update the weight and the residual gradient value based on a result of the summing.

In one general aspect, a neural network apparatus includes one or more processors configured to calculate respective individual gradient values for updating a weight of the neural network, calculate a residual gradient value based on an accumulated gradient value obtained by accumulating the respective individual gradient values and a bit digit representing the weight, tune the respective individual gradient values to correspond to a bit digit representing the residual gradient value, concatenate a remaining value of the residual gradient value excluding a sign bit to the weight and calculating an intermediate concatenation value, sum the tuned respective individual gradient values and the residual gradient value, and update the weight and the residual gradient value based on a result of the summing.

In one general aspect, a non-transitory computer-readable recording medium has recorded thereon computer readable instructions, which, when executed by one or more processors, performs any of the methods described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
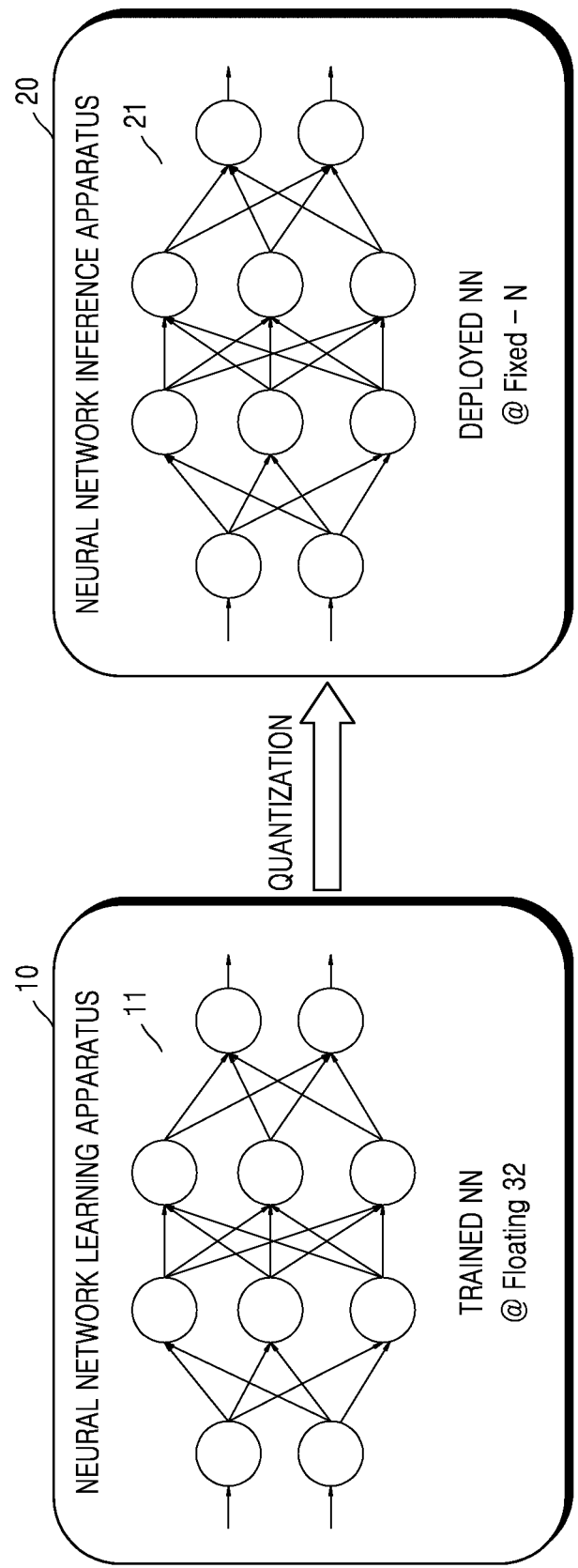
FIG. 1 illustrates an example in which a neural network according to one or more embodiments quantizes a parameter in a floating-point format to a parameter in a fixed-point format.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The expression "according to an embodiment" used throughout the disclosure does not necessarily refer to the same embodiment as they may refer to the same embodiment and also may refer to various embodiments that some or all may be different. Similarly, the use of the term 'may' herein with respect to an example or embodiment, e.g., as to what an example or embodiment may include or implement, means that at least one example or embodiment exists where such a feature is included or implemented while all examples and embodiments are not limited thereto.

The embodiments may be described in terms of functional block components and various processing steps. Some or all of such functional blocks may be realized by any number of hardware and/or software components configured to perform the specified functions and computer readable mediums storing instructions for such hardware or one or more processors. For example, functional blocks according to the present disclosure may be realized by one or more microprocessors or by circuit components for a predetermined function. In addition, for example, functional blocks according to the present disclosure may be implemented with any programming or scripting language. The functional blocks may be implemented in algorithms that are executed on one or more processors. Furthermore, the embodiments described herein may employ any number of existing techniques for electronics configuration, signal processing and/or control, data processing and the like Furthermore, the connecting lines or connectors between components shown in the various figures presented are intended to represent example functional relationships and/or physical or logical couplings between the components. Connections between components may be represented by many alternative or additional functional relationships, physical connections or logical connections in a practical device.

FIG. 1 illustrates an example in which a neural network according to one or more embodiments quantizes a parameter in a floating-point format to a parameter in a fixed-point format.

Referring to FIG. 1, a neural network apparatus 10 may correspond to a computing device having various processing functions, including but not limited to functions to generate a neural network, train or learn the neural network, quantize a floating-point format neural network to a fixed-point format neural network, retrain the neural network, and/or implement the neural network. For example, the neural network apparatus 10 may be implemented as, or, into various types of devices such as personal computers (PCs), server devices, mobile devices, etc. The neural network components of the neural network 10 and/or the neural network inference apparatus may also correspond to the neural network apparatus 1400 of FIG. 14.

The neural network apparatus 10 may generate a trained neural network 11 by repeatedly training (learning) a given initial neural network. In this state, the initial neural network may have, in terms of securing a processing accuracy of the neural network, floating-point format parameters, for example, parameters of 32-bit floating-point precision. The parameters may include various types of data input/output to/from the neural network, for example, input/output activations, as well as weights, biases, etc. of the neural network. As the training of the initial or interim neural network is repeated, the floating-point parameters of a neural network may be tuned to output a more accurate output with respect to a given input, e.g. until a predetermined accuracy or predetermined inaccuracy are met.

The neural network apparatus 10 may transmit the trained neural network 11 to a hardware accelerator, such as a neural network inference apparatus 20 noting that the neural network inference apparatus is not limited to such an accelerator as discussed further below. The neural network inference apparatus 20 may be representative of, or included in mobile devices, embedded devices, etc. The neural network inference apparatus 20 may be dedicated hardware for driving a quantized neural network 21. The neural network inference apparatus 20 is implemented with relatively low power or low performance, the neural network inference apparatus 20 may be implemented to be more appropriate for a fixed-point operation than a floating-point operation. In examples, the neural network inference apparatus 20 may correspond to, but is not limited to, a tensor processing unit (TPU), a neural engine, etc., which are dedicated modules for driving a neural network such a TPU, neural engine, etc., as discussed further herein.

As noted above, the neural network inference apparatus 20 for driving the quantized neural network 21 may be implemented in a separate device that is independent of the neural network apparatus 10. The present disclosure is not limited thereto, and the neural network inference apparatus 20 may be implemented in the same device as the neural network apparatus 10.

Floating-point computation may require a relatively large amount of operations and relatively frequent memory access compared to fixed-point computation. In particular, many operations may be needed for the processing of multiplication and accumulation (MAC) operations of some neural networks. Accordingly, in typical neural network inference apparatuses of smart phones, tablets, wearable devices, etc., which may have a relatively low processing performance, processing of a neural network having floating-point format parameters may not be smooth. As a result, in order to drive a neural network within an allowable accuracy loss while sufficiently reducing the number of operations in the above devices, the floating-point format parameters processed in the neural network may need to be quantized. Such parameter quantization may signify a conversion of a floating-point format parameter having high precision to a fixed-point format parameter having low precision.

The neural network 10 or a neural network quantization apparatus performs quantization to convert parameters of the trained neural network 11 into a fixed-point format of a certain number of bits. In an example, the neural network quantization apparatus may operate by being included in the neural network learning apparatus 10 and the neural network inference apparatus 20, or may operate as an independent third hardware accelerator separate from the neural network apparatus 10 as one or more processors that perform remaining operations of the neural network apparatus 10. Quantization may convert parameters of the trained neural network 11 into a fixed-point format of a certain number of bits, e.g., considering processing performance of a device of neural network apparatus 10 or the neural network inference apparatus 20 that is to deploy the quantized neural network 21. In an example, the neural network quantization apparatus may transmit the quantized neural network 21 to the neural network inference apparatus 20 that is to deploy the quantized neural network 21.

Accordingly, one or more embodiments provide technological improvements that improve the processing operations of a neural network, for example, the improvements may improve memory space requirements, improve memory access and calculation speed, and allow more complex neural networks to be used on smaller electronic devices including smartphones, tablets, and other mobile electronic devices.

The neural network inference apparatus 20 that may deploy the quantized neural network 21 may be representative of, or included in, for example, autonomous vehicles, robotics, smart phones, tablet devices, augmented reality (AR) devices, Internet of things (IoT) devices, etc., which perform voice recognition, image recognition, etc. by using a neural network, but the present disclosure is not limited thereto.

Figure 2:
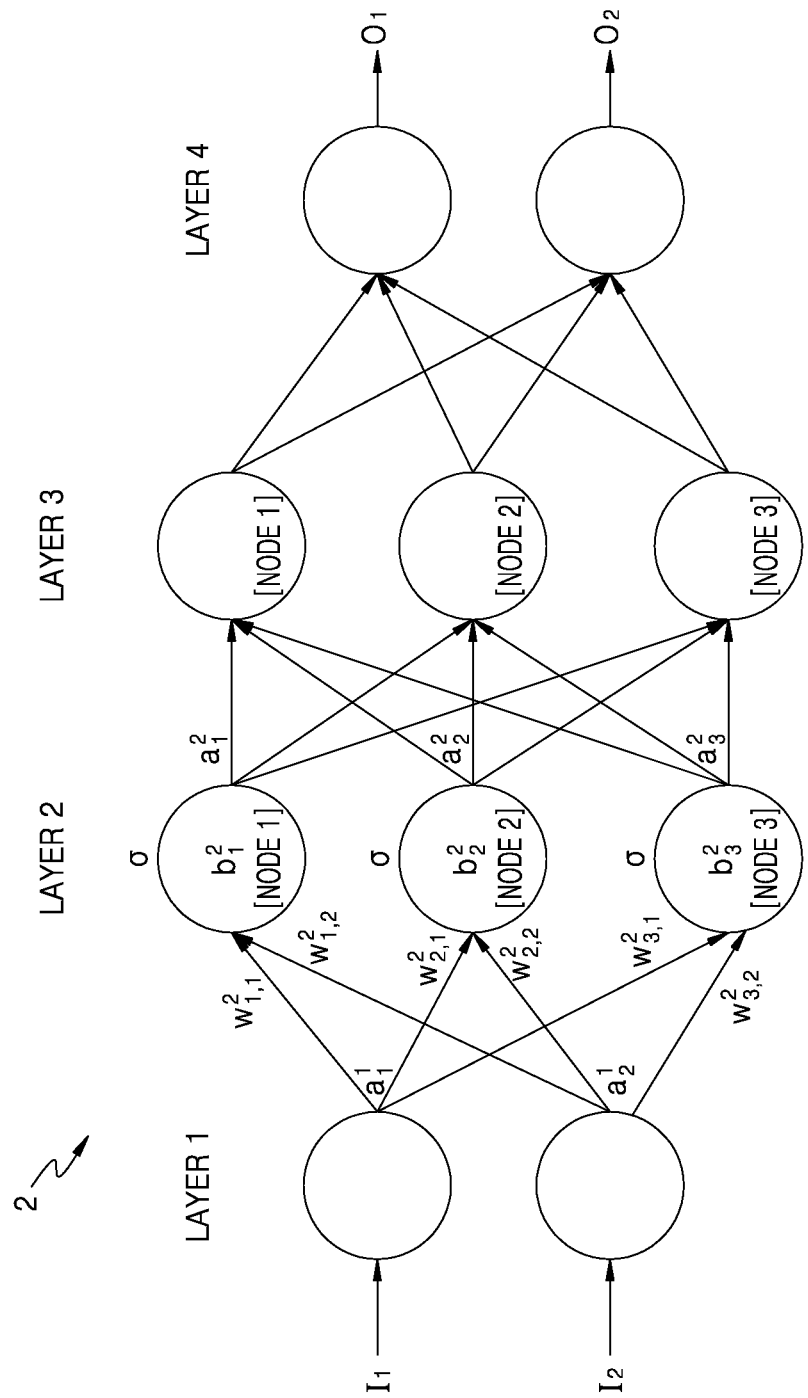
FIG. 2 illustrates an operation performed in a neural network according to one or more embodiments.

FIG. 2 illustrates an operation performed in a neural network 2 according to one or more embodiments.

Referring to FIG. 2, the neural network 2 may have a structure including an input layer, hidden layers, and an output layer, may perform an operation based on received input data, for example, $I_1$ and $I_2$, and may generate output data, for example, $O_1$ and $O_2$, based on a result of the above operation.

The neural network 2 may be, as described above, a deep neural network (DNN) or p-layer neural network including two or more hidden layers. For example, as illustrated in FIG. 2, the neural network 2 may be a DNN including an input layer Layer 1, two hidden layers Layer 2 and Layer 3, and an output layer Layer 4. When the neural network 2 is implemented by a DNN architecture, since the neural network 2 includes relatively more layers for processing effective information, the neural network 2 may process more complicated data sets than a neural network having a signal layer. Although the neural network 2 is illustrated to include four layers, this is merely an example and the neural network 2 may include more or less layers, or more or less nodes. In other words, the neural network 2 may include layers having various structures different from the structure illustrated in FIG. 2 and for various and/or collective trained objectives.

Each of the layers included in the neural network 2 may include a plurality of nodes. The nodes may correspond to a plurality of nodes which are known, processing elements (PE), processing units, or terms similar thereto implemented by hardware components. For example, as illustrated in FIG. 2, Layer 1 may include two nodes (nodes), and each of Layer 2 and Layer 3 may include three nodes. However, this is merely by way of example, and each of the layers included in the neural network 2 may include various numbers of nodes (nodes).

Accordingly, the neural network 2 includes a plurality of layers, and each of the layers includes a plurality of nodes. Depending on the architecture of the neural network 2, nodes included within layers and/or in neighboring layers may be selectively connected according to respective connections, e.g., which may or may not be weighted. For example, the neural network 2 may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply example kernels or weighted connections within layers, to interpret input data applied to the neural network structure. As only examples, herein such an 'interpretation' of input data may include a performed recognition, verification, or rejection, or input data binary or multi-class classification, clustering, pattern observation, transformation, and/or regression, as well as any other trained objective of the neural network in various examples.

Thus, as noted, the nodes included in the respective layers of the neural network 2 may be connected to each other to process data. For example, one node may receive data from other nodes and process the data, and may output an operation result to other nodes.

The input and output of each of the nodes may be, respectively, referred to as an input activation and an output activation, i.e., as a respective result of one or more activation functions of a corresponding node applied with respect to at least input information to the corresponding node. For example, the activation may be as simple as rectified linear unit (ReLU), sigmoid function, or tan h applied to the summation of multiple weighted inputs, or the nodes may be more complex, such being gated or long short-term memory nodes, as non-limiting examples. In other words, the activation may be a parameter corresponding to an output of one or more nodes and also correspond to an input of one or more nodes included in the next layer. Each of the nodes of the example neural network may generate its own activation based on the activations received from the nodes included in the previous layer and corresponding weights and biases. The weight may be a trained parameter of the example neural network used to calculate an output activation in each node, and may be a value allotted to a connection relation between the nodes. The weight may be a trained parameter of the neural network that results from training of parameters of an initial or interim neural network, for example. Thus, a trained weight may be applied to a particular input (or resultant activation from a previous node/layer) to a node, with respective other trained weights being applied to other respective inputs to the node, such that the activation of the node with respect to such weighted inputs and may be a value or activation result that is then output and assigned to a connection relationship between that node and one or more next nodes. In addition to such weight parameters the neural network may also apply biases with such activations. The biases may be set or trained during the training of the neural network, for example.

As noted, each of the nodes may be processed by a computational unit or a processing element that receives an input and outputs an output activation, and ultimately the input and output of each of the nodes may be mapped. In the below equation 1, σ denotes an activation function, $w_{jk}^i$ denotes a weight from a k-th node included in an (i−1)th layer to a j-th node included in an i-th layer, $b_k^i$ denotes a bias of the j-th node included in the i-th layer, and $a_j^i$ denotes an activation of the j-th node of the i-th layer, such that an activation $a_j^i$ may be calculated as below.

Equation 1:

$$a_j^i = \sigma\left(\sum_k (w_{jk}^i \times a_k^{i-1}) + b_j^i\right)$$

As illustrated in FIG. 2, an activation of a first node CH 1 of the second layer Layer 2 may be expressed as $a_1^2$. Furthermore, $a_1^2$ may have a value of "$a_1^2 = \sigma(w_{1,1}^2 \times a_1^1 + w_{1,2}^2 \times a_2^1 + b_1^2)$" according to Equation 1. However, the above-described Equation 1 is merely an example for describing the activation, weight, and bias used to process data in the neural network 2, and the present disclosure is not limited thereto. The activation may be a value obtained by allowing a weighted sum of the activations received from the previous layer to pass through an activation function, such as the aforementioned sigmoid function or a rectified linear unit (ReLU) function.

The neural network 2 may use a low-precision number system. The low-precision numbering system may be a system that reduces a computational amount while reducing precision loss by using data having a relatively smaller number of bits than that of typical floating point number system approaches. For example, unlike such typical neural networks that uses 32-bit or 64-bit floating point or fixed point data, while in an example the neural network 2 that uses the low-precision number system of 8-bit or 16-bit floating point or fixed point data as parameters as non-limiting examples.

Use of the neural network 2 of such 8-bit or 16-bit floating point or fixed point data means that parameters such as the activation value, the weight, and/or the bias value of a particular node of the neural network 2 have an 8-bit or 16-bit floating point or fixed point data format. However, the neural network 2 that uses the low-precision number system may use floating point or fixed point data with a smaller number of bits as parameters and is not limited to the above example.

In the neural network 2, a large number of data sets are exchanged between a plurality of mutually connected nodes and may undergo many computation processes through layers. The neural network 2 that uses the low-precision number system uses data having a smaller number of bits than that of the neural network of the previous 32 bit or 64 bit approaches during many computation processes, and thus a computational amount may be reduced as compared with the previous neural network approaches. The neural network 2 that uses the low-precision number system may implement a technique for reducing the computational amount and minimizing precision loss.

Figure 3A:
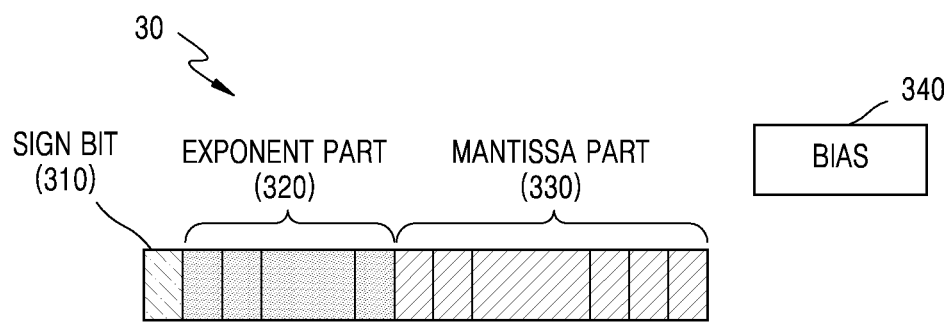
FIG. 3A is a diagram illustrating an example of a floating point value according to one or more embodiments.
Figure 3B:
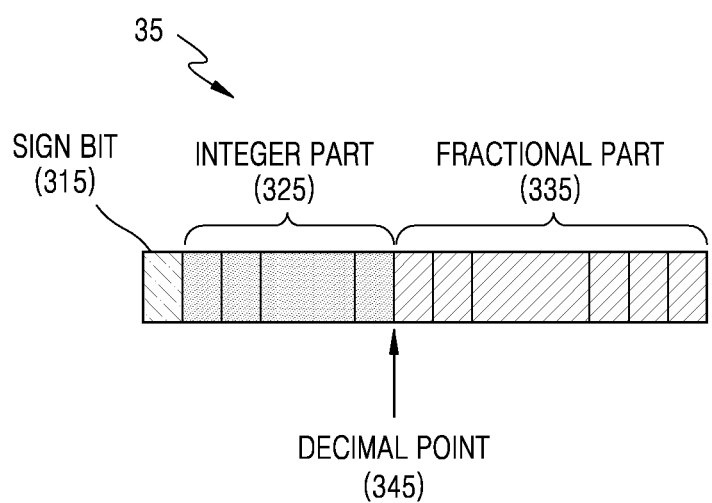
FIG. 3B is an example of a fixed point value according to one or more embodiments.
Figure 3C:
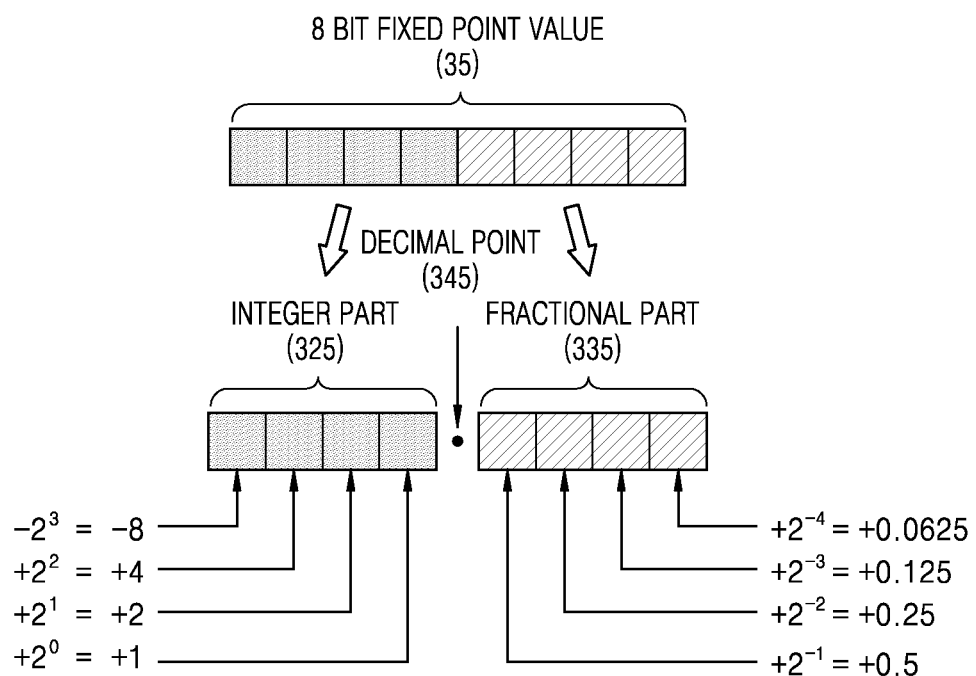
FIG. 3C is a diagram illustrating another example of a fixed point value according to one or more embodiments.

FIG. 3A is a diagram illustrating an example of a floating point value 30 according to one or more embodiments. FIG. 3B is an example of a fixed point value 35 according to embodiments. FIG. 3C is a diagram illustrating another example of a fixed point value according to one or more embodiments.

Referring to FIG. 3A, the floating point value 30 may include a sign bit 310, an exponent part 320, a mantissa part 330, and a bias 340. A floating point indicates that a number is divided into a part indicating a decimal point part (that is, mantissa) and a part indicating a decimal point position.

The mantissa part 330 may correspond to the part indicating the decimal point part. The exponent part 320 may correspond to the part indicating the decimal point position. The sign bit 310 may determine a sign of the floating point value 30. The bias 340 may be a value that is added to or subtracted from the exponent part 320 and that is determined to represent a negative exponent. The floating point value 30 may include the sign bit 310, bits corresponding to the exponent part 320, and bits corresponding to the mantissa part 330. The bias 340 may be previously determined with respect to the floating point value 30 and stored separately.

When the sign bit 310 denotes a sign, the exponent part 320 denotes an exponent, the mantissa part 330 denotes a mantissa, and the bias 340 denotes a bias, the floating point value 30 may be a value according to Equation 2 below.

$$\text{Floating point value} = (-1)^{sign} \cdot 2^{exponent-bias} \cdot \text{mantissa} \quad \text{Equation 2:}$$

Referring to FIG. 3B, the fixed point value 35 may include a sign bit 315, an integer part 325, a fractional part 335, and a decimal point 345. A fixed point means a notation representing decimal of a fixed digit number using a decimal point.

The sign bit 315 may determine a sign of the fixed point value 35. The integer part 325 may correspond to a part representing an integer of the fixed point value 35. The fractional part 335 may correspond to a part representing the decimal of the fixed point value 35. The decimal point 345 may mean a point that is a reference for distinguishing the integer part 325 and the fractional part 335 of the fixed point value 35.

Meanwhile, a value represented by the fixed point value 35 may be described with reference to FIG. 3C. Referring to FIG. 3C, the fixed point value 35 may be an 8-bit fixed point value. The fixed point value 35 may also include the integer part 325, the fractional part 335, and the decimal point 345.

Each of the bits representing the integer part 325 and the fractional part 335 may have a value of 1 or 0. Also, as shown in FIG. 3C, the bits representing the integer part 325 and the fractional part 335 may sequentially have values of −8, +4, +2, +1, +0.5, +0.25, +0.125 and +0.0625. When a most significant bit of the integer part 325 is 1, since a value represented by the most significant bit of the integer part 325 is −8, even though other bits included in the integer part 325 and the fractional part 335 have a certain value, the value represented by the fixed point value 35 may be negative. The most significant bit of the integer part 325 may correspond to the sign bit 315 that determines the sign of the fixed point value 35.

However, FIG. 3C is only an example, and the fixed point value 35 may be a 16-bit fixed point value and may be a fixed point value having any suitable number of bits. Further, the fixed point value 35 may represent a negative number by any one of a coding expression method, a ones' complement method, and a twos' complement method.

Figure 4:
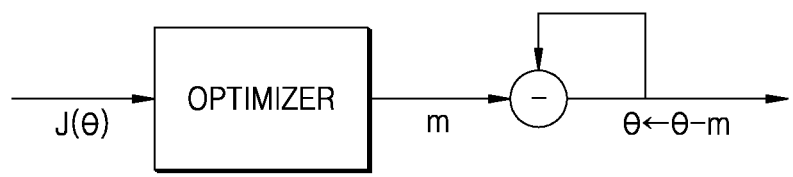
FIG. 4 is a diagram illustrating a process of updating parameters of a neural network according to one or more embodiments.

FIG. 4 is a diagram illustrating a process of updating parameters of a neural network according to one or more embodiments.

The parameters of the neural network may be weights assigned to connection relationships between nodes included in the neural network. Hereinafter, the parameters to be processed in the neural network will be described as weights, but the parameters are not necessarily limited to the weights. The parameters may refer to any data processed in the neural network.

An individual gradient value m may be a value calculated to update a weight θ during training or re-training such as by the neural network apparatus 10 of FIG. 1 as a non-limiting example. An object to learn in the neural network may be the weight θ. The weight θ may need to be updated repeatedly in a learning process for example in multiple iterative updates, the neural network may increasingly produce more accurate and less inacccurate better results.

Meanwhile, to effectively update the weight θ, a value of a loss function J(θ) which defines a difference between a resultant value output from a network and an actual resultant value, and various optimizers may be used to minimize the value of the loss function J(θ).

In an embodiment, an optimizer may implement a gradient descent method. The gradient descent method is a method of finding the value of θ that minimizes the value of the loss function J(θ) by repeating a movement of a gradient by a predetermined amount in the opposite direction with respect to the weight θ. The gradient descent method may be expressed as Equation 3 below. In Equation 3, $\nabla_\theta J(\theta)$ denotes a gradient of the loss function $J(\theta)$ and η denotes a learning rate.

$$\theta \leftarrow \theta - \eta \nabla_\theta J(\theta) \quad \text{Equation 3:}$$

In particular, when calculating the loss function $J(\theta)$, the use of entire learning data may be called batch gradient descent, which typically requires much computation. To reduce computations, a stochastic gradient descent (SGD) method may be used to calculate the loss function $J(\theta)$ only with respect to a collection of a mini-batch instead of an entire batch.

Referring to FIG. 4, when the optimizer uses the gradient descent method, the individual gradient value m is $\eta \nabla_\theta J(\theta)$.

In one or more embodiments, the optimizer may use a momentum method. The momentum method is to give inertia to a process of moving through the gradient descent. Apart from a direction of movement through a current gradient, the momentum method may remember a method in which it moved in the past and additionally move a certain degree in a direction that it previously moved. The momentum method may be expressed as Equation 4 below. In Equation 4, $v_t$ denotes a motion vector in a time step t, and γ denotes a momentum term as to how much momentum to give.

$$v_t = \gamma v_{t-1} + \eta \nabla_\theta J(\theta)$$

$$\theta \leftarrow \theta - v_t \quad \text{Equation 4:}$$

Referring to FIG. 4, when the optimizer uses the momentum method, the individual gradient value m is $\gamma v_{t-1} + \eta \nabla_\theta J(\theta)$.

In addition to the above-described SGD gradient descent method and momentum method, the optimizer may use an Adagrad (Adaptive Gradient) method, an RMSProp method, an AdaDelta (Adaptive Delta) method, an Adam (Adaptive Moment Estimation) method, etc., as non-limiting examples In a typical neural network, the individual gradient value m may have a value much smaller than the weight θ. If such a neural network were to use a low-precision number system (e.g., 8 bits or 16 bits), the individual gradient value m may not be included in a range of values that may represent the weight θ. Accordingly, when the weight θ is updated according to various update methods (the gradient descent method, the momentum method and the like), the individual gradient value m would typically be disregarded and the weight θ may not be updated.

Hereinafter, for convenience of description, an embodiment will be described below where the optimizer uses the gradient descent method.

Figure 5:
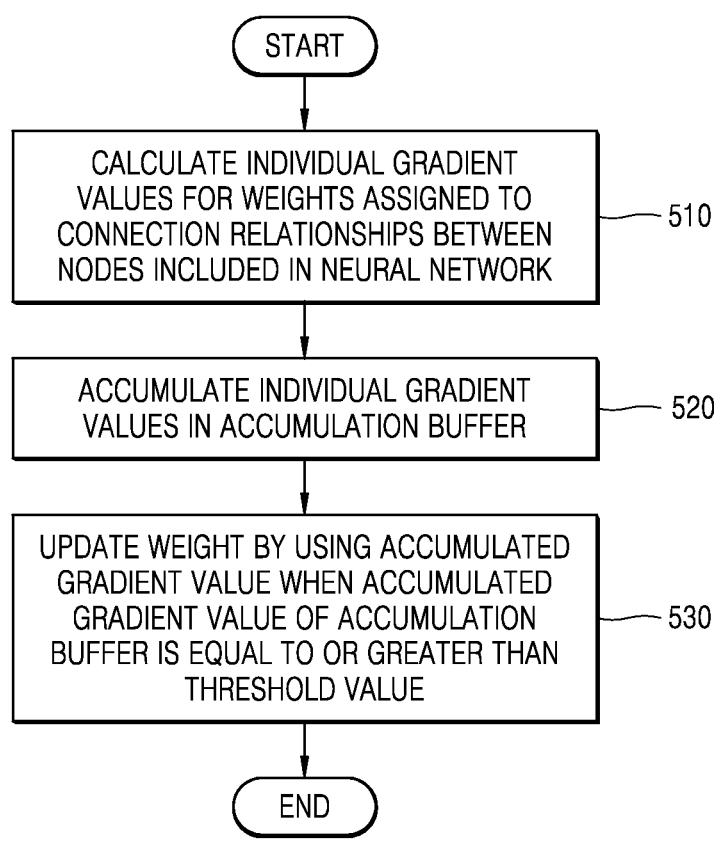
FIG. 5 is a flowchart illustrating an example of a method of processing parameters in a neural network according to one or more embodiments.

FIG. 5 is a flowchart illustrating an example of a method of processing parameters in a neural network according to one or more embodiments.

The neural network may be a neural network that uses a low-precision number system. The parameters may be weights assigned to connection relationships between nodes included in the neural network. Hereinafter, the parameters to be processed in the neural network will be described as weights, but the parameters are not necessarily limited to the weights. The parameters may refer to any data processed in the neural network.

Referring to FIG. 5 in operation 510, the neural network apparatus may calculate individual gradient values for the weights assigned to the connection relationships between the nodes included in the neural network. A weight may be a floating point value or a fixed point value. In an example, the neural network apparatus may correspond to the neural network apparatus 10 of FIG. 1 and the neural network, with resultant trained neural networks, may correspond with the neural network 2 of FIG. 2 in non-limiting examples.

The individual gradient value may be a value that is calculated to update a weight. A target to learn in the neural network may be the weight. The weight may be updated repeatedly in a learning process in order for the neural network to gradually output better results. As one possible method of updating the weight, for example, a gradient descent algorithm may be used. The gradient descent algorithm may mean an algorithm that minimizes an error by tuning a parameter in a gradient direction of a loss function or an error function to find a lowest point of the loss function or the error function. For example, when the loss function denotes L, the parameter is θ, and a learning rate is η, the parameter may be tuned according to Equation 5 below.

$$\theta \leftarrow \theta - \eta \frac{\partial L}{\partial \theta} \quad \text{Equation 5}$$

The $$\eta \frac{\partial L}{\partial \theta}$$

calculated to update the parameter may mean a gradient for tuning the parameter in the gradient direction of the loss function. For example, when the parameter is the weight, $$\eta \frac{\partial L}{\partial \theta}$$

may be the individual gradient value calculated to update the weight.

Meanwhile, in a typical neural network, the individual gradient value $$\eta \frac{\partial L}{\partial \theta}$$

has a smaller value than the weight. If such a typical neural network were to use a low-precision number system (e.g., 8 bits or 16 bits), the individual gradient value $$\eta \frac{\partial L}{\partial \theta}$$

may not be included in a range of values that the weight may represent. Thus, when the weight is updated according to Equation 5, the individual gradient value $$\eta \frac{\partial L}{\partial \theta}$$

may be disregarded and the weight may not be updated. Although update of the weight may be performed repetitively, in order for the neural network to gradually output better results, the weight may not be updated due to a magnitude of the individual gradient value $$\eta \frac{\partial L}{\partial \theta}$$

that is disregarded.

A neural network apparatus according to an embodiment may perform operations 520 and 530 such that the individual gradient values are not disregarded but reflected in a process of updating of the weight. In operation 520, the neural network apparatus may accumulate the individual gradient values in an accumulation buffer. The accumulation buffer may be dedicated hardware for accumulating the individual gradient values and may include memory allocated to accumulate the individual gradient values. The individual gradient values may be accumulated in the accumulation buffer and become an accumulated gradient value. The accumulation buffer may store the accumulated gradient value.

In a neural network example that uses the low-precision number system, the neural network apparatus may accumulate the individual gradient values to a magnitude that may affect the weight such that the individual gradient values are not disregarded in the process of updating of the weight.

In operation 530, the neural network apparatus may update the weight by using the accumulated gradient value when the accumulated gradient value of the accumulation buffer is equal to or greater than a threshold value. The neural network apparatus may determine whether the accumulated gradient value of the accumulation buffer is equal to or greater than the threshold value. The threshold value may be a value for determining whether the accumulated gradient value has been accumulated to the magnitude that may affect the weight. For example, the threshold value may be a value corresponding to a least significant bit digit of the weight.

In an example where the weight is a fixed point value, the least significant bit digit of the weight may be a digit corresponding to a least significant bit of the bits representing the weight. As an example, when the least significant bit of the weight represents a $2^{-4}$ digit, the least significant bit digit of the weight may be a $2^{-4}$ digit, and the threshold value may be $2^{-4}$ that corresponds to the least significant bit digit of $2^{-4}$.

In an example the weight is a floating point value, the least significant bit digit of the weight may be a digit corresponding to the least significant bit of the bits representing an exponent part of the weight. However, when the weight is the floating point value, a bias may be considered to determine the least significant bit digit. As an example, even though the least significant bit of the bits representing the exponent part of the weight represents a $2^0$ digit, when the bias is 8, the least significant bit digit of the weight is not a $2^{2^0}=2^1$ digit but a $2^{1-8}=2^{-7}$ digit, and the threshold value may be $2^{-7}$ that corresponds to the least significant bit digit of $2^{-7}$.

However, this is merely an example, and the threshold value may be any appropriate value between the value corresponding to the least significant bit digit of the weight and a value corresponding to a most significant bit digit of the accumulated gradient value.

When the accumulated gradient value is equal to or greater than the threshold value, since the accumulated gradient value has a magnitude that may affect the weight, the neural network apparatus may update the weight by using the accumulated gradient value.

For example, the neural network apparatus may determine a part of the accumulated gradient value that may be summed to a bit digit of the weight as an effective gradient value. The effective gradient value means a value actually used to update the weight e.g., in the accumulated gradient value. A range of values that weights may represent may be limited by digits of bits allocated to the weights. Therefore, only values corresponding to values above the least significant bit digit of the weight among the accumulated gradient value may be added to the weight.

As an example, when the weight is an 8-bit fixed point value including a 1-bit sign bit, a 3-bit integer part, and a 4-bit fractional part, the bit digit of the weight may be $2^2$, $2^1$, $2^0$, $2^{-1}$, $2^{-2}$, $2^{-3}$, and $2^{-4}$ digits. Due to the limit of the range of values that the weight may represent, in order to add a value to the weight, the weight needs to include at least one of values corresponding to any digit among $2^2$, $2^1$, $2^0$, $2^{-1}$, $2^{-2}$, $2^{-3}$, and $2^{-4}$. As an example, suppose that a value of 1.265625 (a decimal number) is summed to the weight. Since 1.265625 is $1 \times 2^0 1 \times 2^{-2} + 1 \times 2^{-8}$, $1 \times 2^0$ and $1 \times 2^{-2}$ corresponding to the bit digit of the weight may be summed to the weight, whereas $1 \times 2^{-8}$ may not be summed to the weight due to the limit of the range of values that the weight may represent.

Meanwhile, a part that may be summed to the bit digit of the weight may include multiples of a value represented by the least significant bit digit of the weight. In the preceding example, the value corresponding to the least significant bit digit of the weight is $2^{-4}$, and the art of the accumulated gradient value that may be summed to the bit digit of the weight is $2^2$, $2^1$, $2^0$, $2^{-1}$, $2^{-2}$, $2^{-3}$, and $2^{-4}$ that are values corresponding to the $2^2$, $2^1$, $2^0$, $2^{-1}$, $2^{-2}$, $2^{-3}$, and $2^{-4}$ digits. All of $2^2$, $2^1$, $2^0$, $2^{-1}$, $2^{-2}$, $2^{-3}$, and $2^{-4}$ digits are multiples of $2^{-4}$ that is the value corresponding to the least significant bit digit.

Since the threshold value may be the value corresponding to the least significant bit digit of the weight, the effective gradient value may include multiples of the threshold value. For example, when the accumulated gradient value denotes Accumulated gradient and the threshold value denotes threshold, the effective gradient value may be expressed by Equation 6 below.

$$\text{effective gradient} = \left\lfloor \frac{\text{Accumulated gradient}}{\text{threshold}} \right\rfloor \times \text{threshold} \qquad \text{Equation 6}$$

In Equation 6, $$\left\lfloor \frac{\text{Accumulated gradient}}{\text{threshold}} \right\rfloor$$

may be a quotient obtained by dividing Accumulated gradient by threshold. The effective gradient value may mean a value obtained by multiplying the quotient obtained by dividing the accumulated gradient value by the threshold value by the threshold value. Further, the effective gradient value may be the largest value among multiples of the threshold value that is smaller than the accumulated gradient value. For example, when Accumulated gradient is 2.2 (a decimal number) and threshold is 1 (a decimal number), the effective gradient value may be 2 that is the largest value among 1 and 2 that are multiples of the threshold value of 1 that is smaller than the accumulated gradient value of 2.2.

The neural network apparatus may add the effective gradient value to the weight. Since the effective gradient value is a value used to update the weight, the neural network apparatus may update the weight by adding the effective gradient value to the weight.

The neural network apparatus may also subtract the effective gradient value from the accumulated gradient value of the accumulation buffer. Since the effective gradient value of the accumulated gradient value of the accumulation buffer is reflected by the weight, the neural network apparatus may subtract the effective gradient value from the accumulated gradient value of the accumulation buffer. For example, since the weight is updated, the accumulated gradient value may be subtracted according to Equation 7 below.

$$ccumulated\ gradient \leftarrow Accumulated\ gradient - \left\lfloor \frac{Accumulated\ gradient}{threshold} \right\rfloor \times threshold \qquad \text{Equation 7}$$

In Equation 7, since $$\left\lfloor \frac{Accumulated\ gradient}{threshold} \right\rfloor \times threshold \text{ is the effective gradient value,}$$

the accumulated gradient value of the accumulation buffer may have a value obtained by subtracting the effective gradient value from a previous accumulated gradient value.

The neural network apparatus may continuously accumulate the individual gradient values in the accumulated gradient value of the accumulation buffer after updating the weight and may repeat the processes described above. The method of processing parameters in the neural network according to an embodiment may accumulate individual gradient values much smaller than the value of the weight to a magnitude that may affect the weight and may generally apply the individual gradient values to the weight, instead of disregarding or discarding the individual gradient values as previously implemented, thereby minimizing a rounding error in the neural network that uses a low-precision number system. Also, the method of processing parameters in the neural network according to the present disclosure may minimize a precision loss by continuously maintaining a remaining part of the accumulated gradient value in the accumulation buffer after updating the accumulated gradient value to the weight.

Meanwhile, the neural network apparatus may determine whether the accumulated gradient value is equal to or greater than the threshold value at each predetermined update period. For example, the update period t=4, i.e., the time at which four individual gradient values are calculated, but is not limited thereto.

Figure 6:
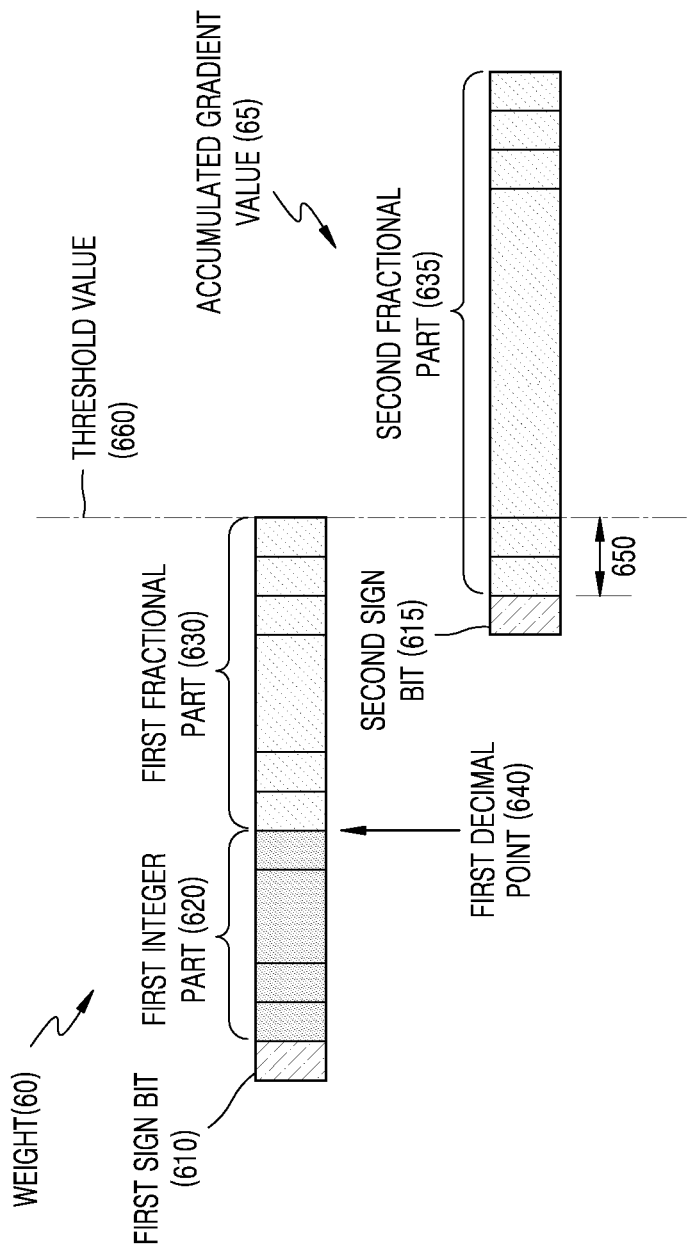
FIG. 6 is a diagram for explaining an example of updating a weight of a fixed point parameter format according to one or more embodiments.

FIG. 6 is a diagram for explaining an example of updating a weight 60 of a fixed point parameter format according to an embodiment.

Referring to FIG. 6, in a neural network that uses fixed point parameters, a weight 60 may be a fixed point value including a first sign bit 610, a first integer part 620, a first fractional part 630, and a first decimal point 640, and an accumulated gradient value 65 may be a fixed point value including a second sign bit 615, a second fractional part 635, and a second decimal point (not shown). According to embodiments, the weight 60 may be a dynamic fixed point value at which the first decimal point 640 is movable. Since the first decimal point 640 moves, the number of bits (length) of the first fractional part 630 may be tuned.

The accumulated gradient value 65 may not include an integer part. For example, when the first decimal point 640 and the second decimal point are the same, since the accumulated gradient value 65 may represent only values significantly smaller than the weight 60, the accumulated gradient value 65 may not include an integer part but may include a fractional part (i.e. the second fractional part 635). Meanwhile, the second decimal point may be the same as the first decimal point 640, or may be different. The second decimal point may be tuned depending on a situation.

The weight 60 may be a fixed point value of m bits (m being an arbitrary natural number). The accumulated gradient value 65 may be a fixed point value of n bits (n is any natural number), m and n may be the same value or may be different values. In a neural network that uses a low-precision number system, each of m and n may have a value of 8 or 16, but are not limited thereto.

The accumulated gradient value 65 may have a relatively small value compared to the weight 60. Thus, a value corresponding to each of bits representing the weight 60 may be substantially greater than a value corresponding to each of bits representing the accumulated gradient value 55. However, the value corresponding to any one of the bits representing the weight 60 may be equal to the value corresponding to any one of the bits representing the accumulated gradient value 55. To update the weight 60, since a part of the accumulated gradient value 65 may be summed to the weight 60, some of lower bits of the weight 60 may overlap with some of upper bits of the accumulated gradient value 55.

When bits 550 overlapping between the weight 60 and the accumulated gradient value 65 are k bits (k is an arbitrary natural number), the neural network may obtain the substantially same effect as using fixed point data of (m+n−2−k) bits.

The bits 550 overlapping between the weight 60 and the accumulated gradient value 65 may be determined with respect to a threshold value 560. The threshold value 560 may be a value for determining whether the accumulated gradient value 65 has been accumulated to a magnitude that may affect the weight 60. For example, the threshold value 560 may be a value corresponding to a least significant bit digit of the weight 60. The overlapping bits 550 may be bits representing a value equal to or greater than the threshold value 560 among the bits representing the accumulated gradient value 55. The overlapping bits 550 may overlap with some of the lower bits of the weight 60 and may therefore be summed with the weight 60. Meanwhile, the lower bits of the weight 60 may represent the first fractional part 630.

The neural network apparatus may update the weight 60 by using the accumulated gradient value 65 when the individual gradient values are accumulated and the accumulated gradient value 65 increases to the magnitude that may affect the weight 60. For example, the neural network apparatus may sum a value of at least one bit 650 that overlaps the first fractional part 630 of the weight 60 among bits representing the second fractional part 635 of the accumulated gradient value 65 and the weight 60. The value represented by the at least one bit 550 that overlaps may correspond to an effective gradient value.

Meanwhile, a padding method may be applied in a process of summing the value represented by the at least one bit 550 that overlaps the first fractional part 630 of the weight 60 among the bits representing the second fractional part 635 of the accumulated gradient value 65 and the weight 60.

Figure 7:
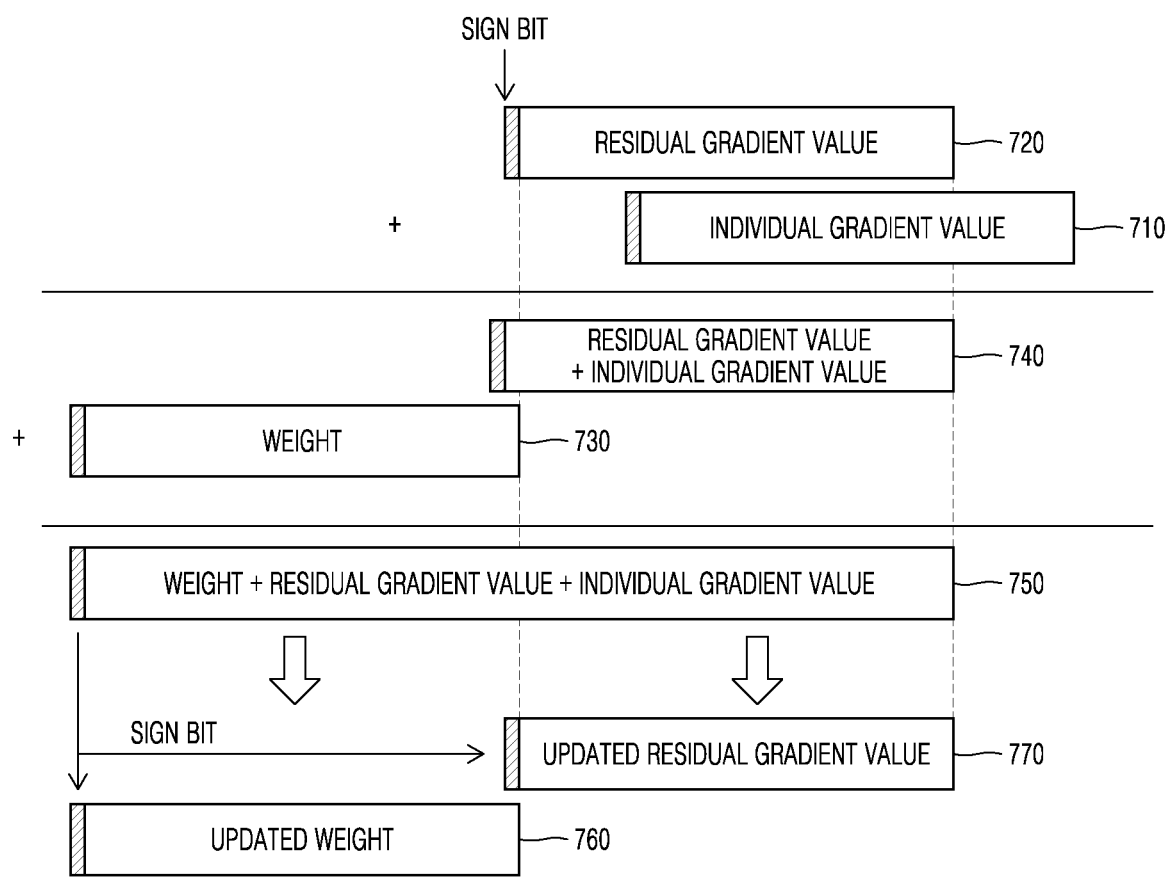
FIG. 7 is a diagram illustrating an example of updating a weight and a residual gradient value according to one or more embodiments.

FIG. 7 is a diagram illustrating an example of updating a weight 730 and a residual gradient value 720 according to an embodiment.

Referring to FIG. 7, a neural network apparatus may update the weight 730 and the residual gradient value 720 by using an individual gradient value 710, the residual gradient value 720, and the weight 730. In an embodiment, the neural network apparatus may represent the individual gradient value 710, the residual gradient value 720, and the weight 730 by using a low-precision number system. For example, the individual gradient value 710, the residual gradient value 720, and the weight 730 may be 8-bit or 16-bit floating point or fixed point values, but are not limited thereto. In an example, the neural network apparatus may correspond to the neural network apparatus 10 of FIG. 1, as a non-limiting example.

The neural network apparatus may calculate the individual gradient value 710 for weights assigned to the connection relationships between nodes included in a neural network. The individual gradient value 710 may be a value that is calculated to update the weight 730. An object to learn in the neural network may be the weight 730. In order for the neural network to output increasingly better results, the weight 730 may be updated repeatedly in a learning process. As described above with reference to FIG. 4, an optimizer of the neural network apparatus may calculate the individual gradient value 710 by using a gradient descent method, a momentum method, or the like, as non-limiting examples.

The neural network apparatus may accumulate the individual gradient value 710 in an accumulation buffer. In the neural network that uses a low-precision number system, the neural network apparatus may accumulate the individual gradient value 710 to a magnitude that may affect the weight 730 such that the individual gradient value 710 is not disregarded in a process of updating of the weight 730.

When an accumulated gradient value of the accumulation buffer is equal to or greater than a threshold value, the neural network apparatus may determine a part of the accumulated gradient value that may be summed with a bit digit of the weight 730 as an effective gradient value. The neural network apparatus may calculate the residual gradient value 720 by subtracting the effective gradient value from the accumulated gradient value.

Referring to FIG. 7, the neural network apparatus may calculate an intermediate summation value 740 by summing the individual gradient value 710 and the residual gradient value 720. In FIG. 7, both the individual gradient value 710 and the residual gradient value 720 may include sign bits in the Most Significant Bit (MSB). The neural network apparatus may calculate the intermediate summation value 740 of the individual gradient value 710 and the residual gradient value 720 in consideration of the sign bits of the two values.

At this time, since the bit numbers and the bit digits of the individual gradient value 710 and the residual gradient value 720 may not correspond, the neural network apparatus may tune the individual gradient value 710 to correspond to the bit number and the bit digit of the residual gradient value 720. In an embodiment, the neural network apparatus may tune the individual gradient value 710 to correspond to the bit number and the bit digit of the residual gradient value 720 by quantizing and padding the individual gradient value 710.

The neural network apparatus may calculate a final summation value 750 by summing the intermediate summation value 740 and the weight 730. The neural network apparatus may obtain an updated weight 760 and an updated residual gradient value 770 from the final summation value 750. In an embodiment, the neural network apparatus may obtain the updated weight 760 and the updated residual gradient value 770 from the final summation value 750 based on the bit digit of the weight 730. For example, the neural network apparatus may obtain the bit digit value of the final summation value 750 corresponding to the bit digit of the weight 730 as the updated weight 760. The neural network apparatus may also obtain the bit digit value of the final summation value 750 that does not correspond to the bit digit of the weight 730 as an updated residual gradient value 770.

At this time, the MSB of the updated weight 760 may be a sign bit which is the MSB of the final summation value 750. The neural network apparatus may also obtain the sign bit of the final summation value 750 and add the obtained sign bit to the updated residual gradient value 770 such that the obtained sign bit may be the MSB of the updated residual gradient value 770.

Meanwhile, when an accumulated gradient value that is a summation result of the updated residual gradient value 770 and new individual gradient values is equal to or greater than a threshold value by summing the updated residual gradient value 770 and the new individual gradient values, the weight 730 and the residual gradient value 720 may be updated again by repeating the above-described processes.

Figure 8:
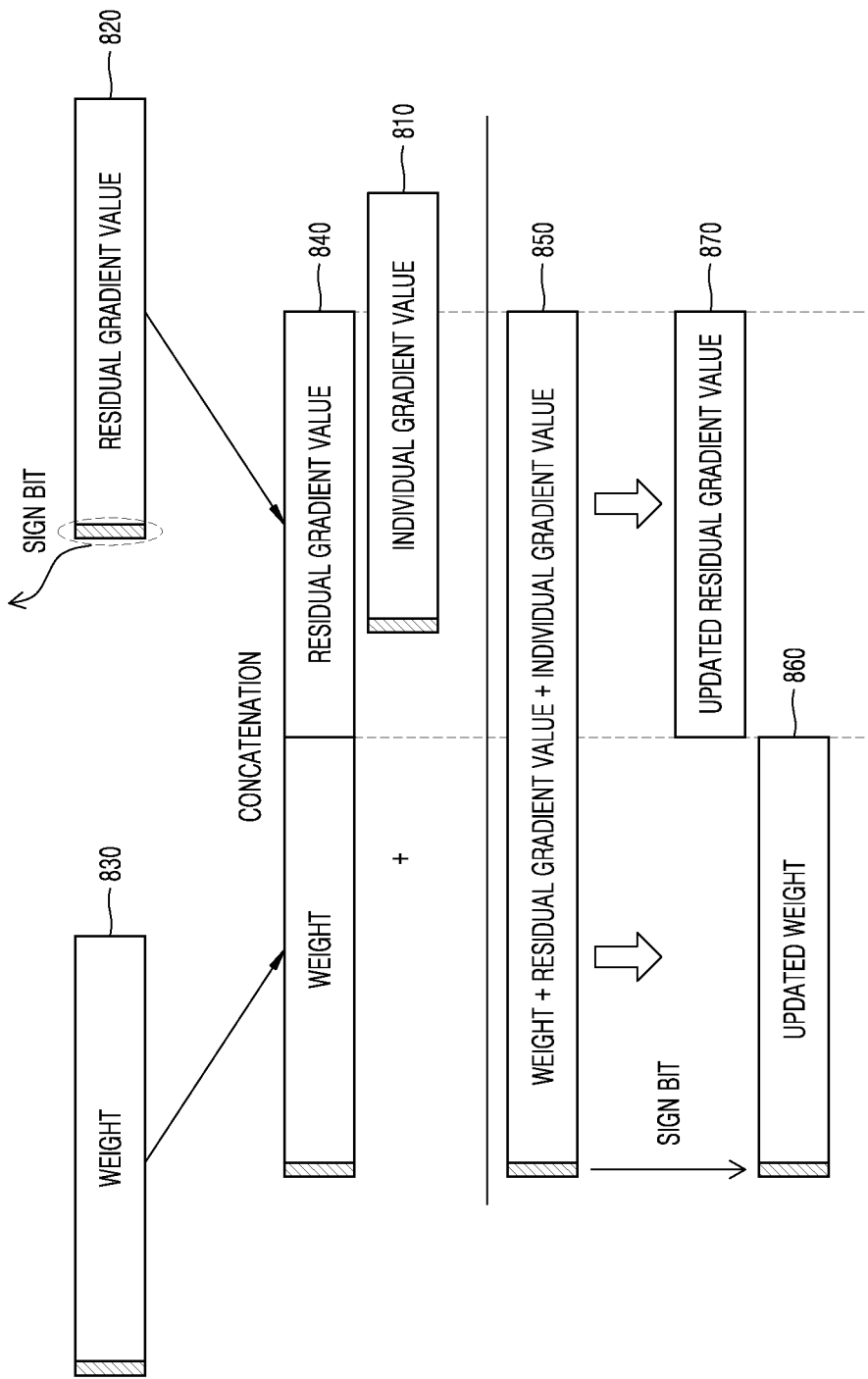
FIG. 8 is a diagram illustrating an example of updating a weight and a residual gradient value according to one or more embodiments.

FIG. 8 is a diagram illustrating an example of updating a weight 830 and a residual gradient value 820 according to an embodiment.

Referring to FIG. 8, since the bit numbers and the bit digits of an individual gradient value 810 and the residual gradient value 820 may not correspond, a neural network apparatus may tune the individual gradient value 810 to correspond to the bit number and the bit digit of the residual gradient value 820. In an embodiment, the neural network apparatus may tune the individual gradient value 810 to correspond to the bit number and the bit digit of the residual gradient value 820 by quantizing and padding the individual gradient value 810. In an example, the neural network apparatus may correspond to the neural network apparatus 10 of FIG. 1, as a non-limiting example.

Hereinafter, redundant descriptions between FIGS. 7 and 8 will be omitted for the sake of convenience.

The neural network apparatus may calculate an intermediate concatenation value 840 by concatenating the residual gradient value 820 from which a sign bit is removed to the weight 830. At this time, the MSB of the intermediate concatenation value 840 may correspond to the sign bit of the weight 830.

The neural network apparatus may calculate a final summation value 850 by summing the intermediate concatenation value 840 and the individual gradient value 810. The neural network apparatus may obtain an updated weight 860 and an updated residual gradient value 870 from the final summation value 850. In an embodiment, the neural network apparatus may obtain the updated weight 860 and the updated residual gradient value 870 from the final summation value 850 based on the bit digit of the weight 830. For example, the neural network apparatus may obtain the bit digit value of the final summation value 850 corresponding to the bit digit of the weight 830 as the updated weight 860. The neural network apparatus may also obtain the bit position value of the final summation value 850 which does not correspond to the bit digit of the weight 830 as the updated residual gradient value 870.

At this time, the MSB of the updated weight 860 may be a sign bit which is the MSB of the final summation value 850. However, like the residual gradient value 820 before updated, the updated residual gradient value 870 may not include a sign bit. That is, unlike in FIG. 7, the neural network apparatus may not add the sign bit of the final summation value 850 to the updated residual gradient value 870.

Meanwhile, when an accumulated gradient value that is a summation result of the updated residual gradient value 870 and new individual gradient values is equal to or greater than a threshold value by summing the updated residual gradient value 870 and the new individual gradient values, the weight 830 and the residual gradient value 820 may be updated again by repeating the above-described processes.

Figure 9:
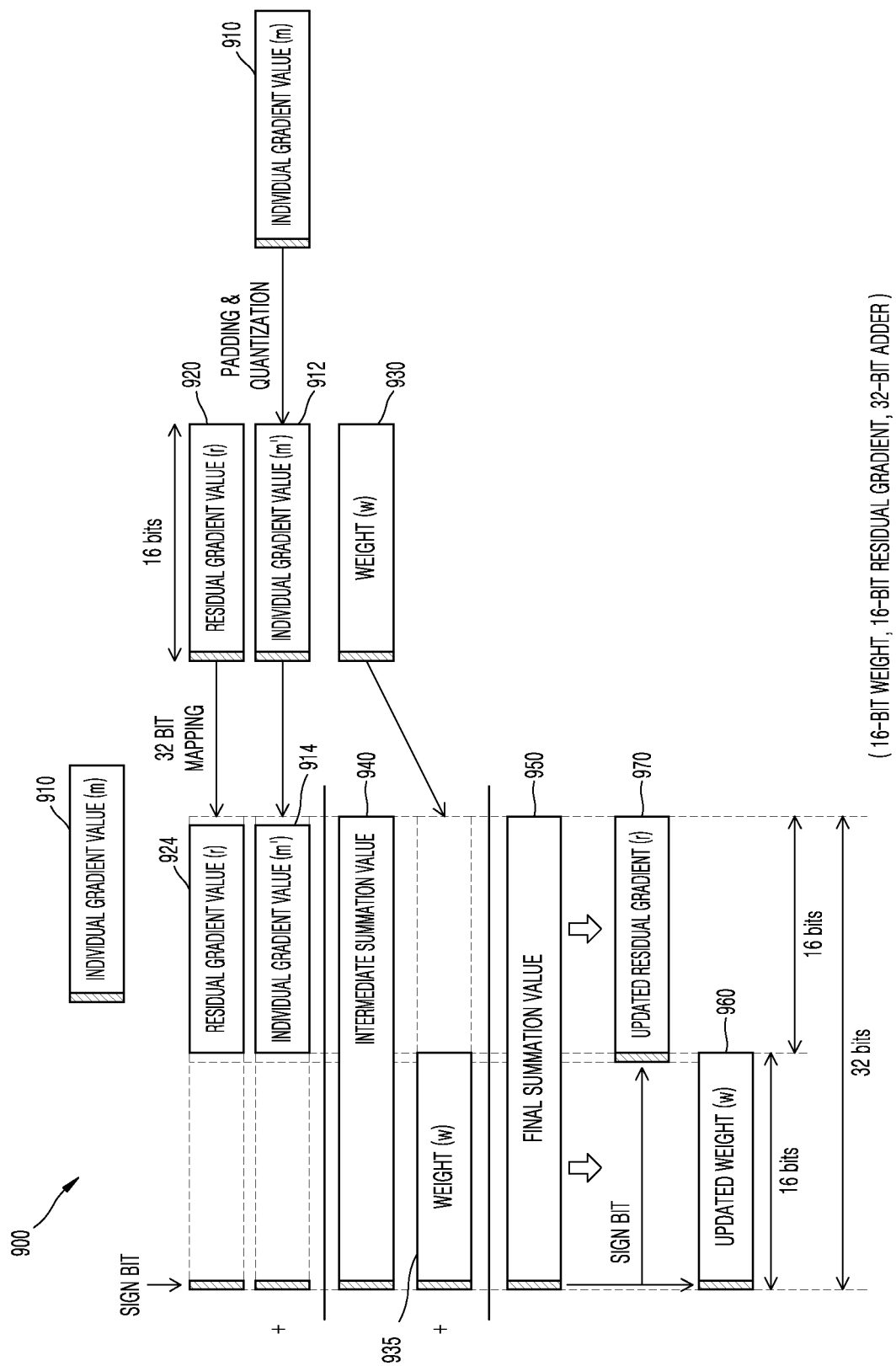
FIG. 9 is a diagram illustrating an example of updating a weight and a residual gradient value by using an adder according to one or more embodiments.

FIG. 9 is a diagram illustrating an example of updating a weight 930 and a residual gradient value 920 by using an adder 900 according to an embodiment.

A neural network apparatus may sum an individual gradient value 910, the residual gradient value 920, and the weight 930 by using adder 900. The adder 900 is a type of arithmetic logic unit (ALU) and may have a predetermined number of bits. The processing performance of the adder 900 may be determined according to the number of bits of the adder 900. That is, the number of bits of data that may be summed by the adder 900 may be determined according to the number of bits of the adder 900.

The neural network apparatus may update the weight 930 and the residual gradient value 920 by using the individual gradient value 910, the residual gradient value 920 and the weight 930. The individual gradient value 910, the residual gradient value 920, and the weight 930 may be fixed point or floating point values used in a low-precision number system.

In FIG. 9, a process of summing the 16-bit individual gradient value 910, the residual gradient value 920 and the weight 930 by using the 32-bit adder 900 is shown.

Referring to FIG. 9, a neural network apparatus may tune the individual gradient values 910 such that the bit number and the bit digit of the individual gradient values 910 correspond to the bit number and the bit digit of the residual gradient value 920. In an embodiment, the neural network apparatus may tune the individual gradient values 910 such that the bit number and the bit digit of the individual gradient values 910 correspond to the bit number and the bit digit of the residual gradient value 920 by quantizing and padding the individual gradient value 910. In an example, the neural network apparatus may correspond to the neural network apparatus 10 of FIG. 1, as a non-limiting example.

Specifically, the neural network apparatus may quantize the individual gradient values 910 such that a value of the individual gradient values 910 less than the least significant bit digit of the residual gradient value 920 is omitted. The neural network apparatus may also pad the quantized individual gradient value 910 such that a value up to a bit digit corresponding to the most significant bit digit of the residual gradient value 920 is present. That is, the neural network apparatus may calculate a tuned individual gradient value 912 by applying quantization and padding to the individual gradient values 910. The bit number and bit digit of the tuned individual gradient value 912 may correspond to the bit number and bit digit of the residual gradient value 920.

Meanwhile, when at least one of the bit number and the bit digit of the individual gradient value 910 corresponds to the bit number and bit digit of the residual gradient value 920, a process of quantizing or padding the individual gradient value 910 may be omitted.

The neural network apparatus may map the tuned individual gradient value 912 and the residual gradient value 920 to the adder 900 based on the number of bits of the adder 900. That is, the neural network apparatus may map the 16-bit tuned individual gradient value 912 and the residual gradient value 920 to 32 bits such that computation may be performed by using the 32-bit adder 900. In an embodiment, the neural network apparatus may map the 16-bit tuned individual gradient value 912 and the residual gradient value 920 to 32 bits by using a ones' complement method or a twos' complement method. However, the mapping method is not limited thereto.

For example, the neural network apparatus may map the sign bit of each of the 16-bit tuned individual gradient value 912 and the residual gradient value 920 to the most significant bit digit of the adder 900 and add remaining 15 bits to remaining lower 15 bit digits of the adder 900 excluding the least significant bit thereof. In this case, remaining upper 15 bit digits and the least significant bit digit of the adder 900 may be padded excluding the MSB of the adder 900.

The neural network apparatus may use the adder 900 to calculate an intermediate summation value 940 by summing an individual gradient value 914 and a residual gradient value 924 mapped to the adder 900. In FIG. 9, both the individual gradient value 914 and the residual gradient value 924 may include sign bits in the Most Significant Bit (MSB), and the neural network apparatus may calculate the intermediate summation value 940 by summing the individual gradient value 914 and the residual gradient value 924 in consideration of the sign bits of the two values.

The neural network apparatus may map the weight 930 to the adder 900 based on the number of bits of the adder 900. As described above, the neural network apparatus may map the 16-bit weight 930 to 32 bits such that computation may be performed by using the 32-bit adder 900. The neural network apparatus may map the weight 935 from the most significant bit digit to the least significant bit digit of the adder 900. That is, the neural network apparatus may map the 16-bit weight 935 to the upper 16-bit digit of the adder 900. Also, the lower 16-bit digit of the adder 900 where the corresponding weight 935 is not present may be padded.

The neural network apparatus may calculate a final summation value 950 by summing a weight 935 and the intermediate summation value 940 mapped to the adder 900. The neural network apparatus may obtain an updated weight 960 and an updated residual gradient value 970 from the final summation value 950.

In an embodiment, the neural network apparatus may obtain the updated weight 960 and the updated residual gradient value 970 from the final summation value 950 based on the bit digit of the weight 930. The neural network apparatus may obtain the bit digit value of the final summation value 950 corresponding to the bit digit of the weight 930 as the updated weight 960. Also, the neural network apparatus may obtain the bit digit value of the final summation value 950 which does not correspond to the bit digit of the weight 930 as the updated residual gradient value 970.

For example, the neural network apparatus may obtain the upper 16-bit digit value of the final summation value 950 corresponding to the bit digit of the weight 930 as the updated weight 960 and obtain the lower 16-bit digit value of the final summation value 950 as the updated residual gradient value 970 from the 32-bit final summation value 950 that is a computation result of the 32-bit adder 900.

The neural network apparatus may also obtain the sign bit which is the MSB of the final summation value 950 and add the obtained sign bit such that the obtained sign bit is the MSB of the updated residual gradient value 970.

Figure 10:
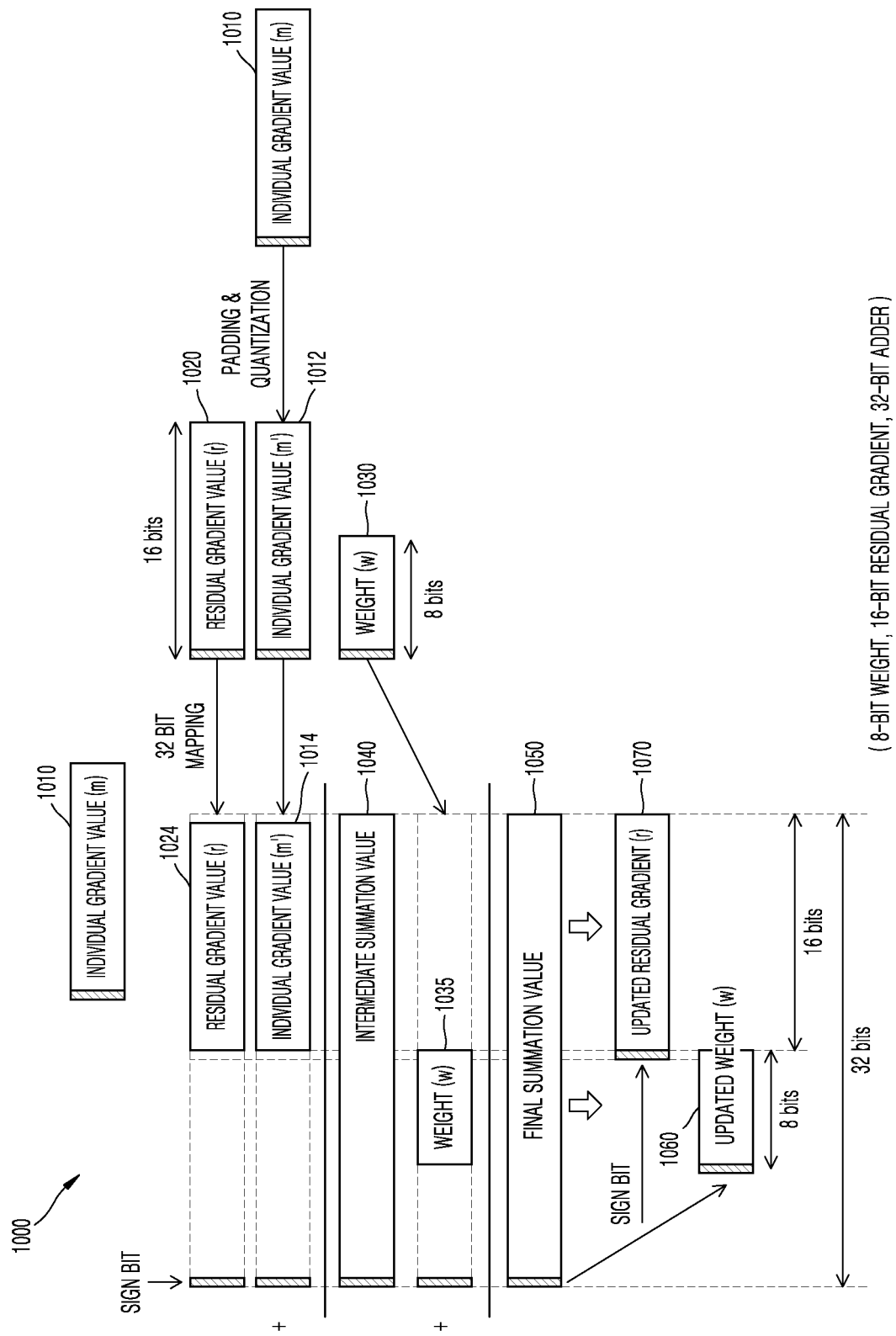
FIG. 10 is a diagram illustrating an example of updating a weight and a residual gradient value by using an adder according to one or more embodiments.

FIG. 10 is a diagram illustrating an example of updating a weight 1030 and a residual gradient value 1020 by using an adder 1000 according to an embodiment.

Hereinafter, redundant descriptions between FIGS. 9 and 10 will be omitted for convenience of description.

In FIG. 10, a process of summing a 16-bit individual gradient value 1010, the residual gradient value 1020 and the 8-bit weight 1030 by using the 32-bit adder 1000 is shown.

A neural network apparatus may map the weight 1030 to the adder 1000 based on the number of bits of the adder 1000. That is, the neural network apparatus may map the 8-bit weight 1030 to 32 bits such that computation may be performed by using the 32-bit adder 1000. Meanwhile, the weight 930 of FIG. 9 is 16 bits, while the weight 1030 of FIG. 10 is 8 bits. In this case, the neural network apparatus may pad the weight 1030 such that a value to the most significant bit digit of the adder 1000 is present. The neural network apparatus may map the padded weight 1030 from the most significant bit digit of the adder 1000 to the lower bit digit. That is, the neural network apparatus may map the 16-bit padded weight 1030 to the upper 16-bit digit of the adder 1000. Also, the lower 16-bit digit of the adder 1000 where the corresponding weight 1030 is not present may also be padded. In an example, the neural network apparatus may correspond to the neural network apparatus 10 of FIG. 1, as a non-limiting example.

The neural network apparatus may calculate a final summation value 1050 by summing a weight 1035 mapped to the adder 1000 and an intermediate summation value 1040. The neural network apparatus may obtain an updated weight 1060 and an updated residual gradient value 1070 from the final summation value 1050.

In an embodiment, the neural network apparatus may obtain the updated weight 1060 and the updated residual gradient value 1070 from the final summation value 1050 based on the bit digit of the weight 1030. The neural network apparatus may obtain the bit digit value of the final summation value 1050 corresponding to the bit digit of the weight 1030 as the updated weight 1060. The neural network apparatus may also obtain the bit digit value of the final summation value 1050 that does not correspond to the bit digit of the weight 1030 as the updated residual gradient value 1070.

For example, the neural network apparatus may obtain the lower 16-bit digit value of the 32-bit final summation value 1050, which is a computation result of the 32-bit adder 1000, that does not correspond to the bit digit of the weight 1030 as the updated residual gradient value 1070. Meanwhile, the neural network apparatus may obtain the remaining bit digit value, excluding a padder (the upper 8-bit digit), from the upper 16-bit digit value of the 32-bit final summation value 1050 as the updated weight 1060.

The neural network apparatus may also obtain the sign bit which is the MSB of the final summation value 1050 and then replace the MSB of the updated weight 1060 with the sign bit of the final summation value 1050 and add the sign bit of the final summation value 1050 such that the added sign bit is the MSB of the updated residual gradient value 1070.

Figure 11:
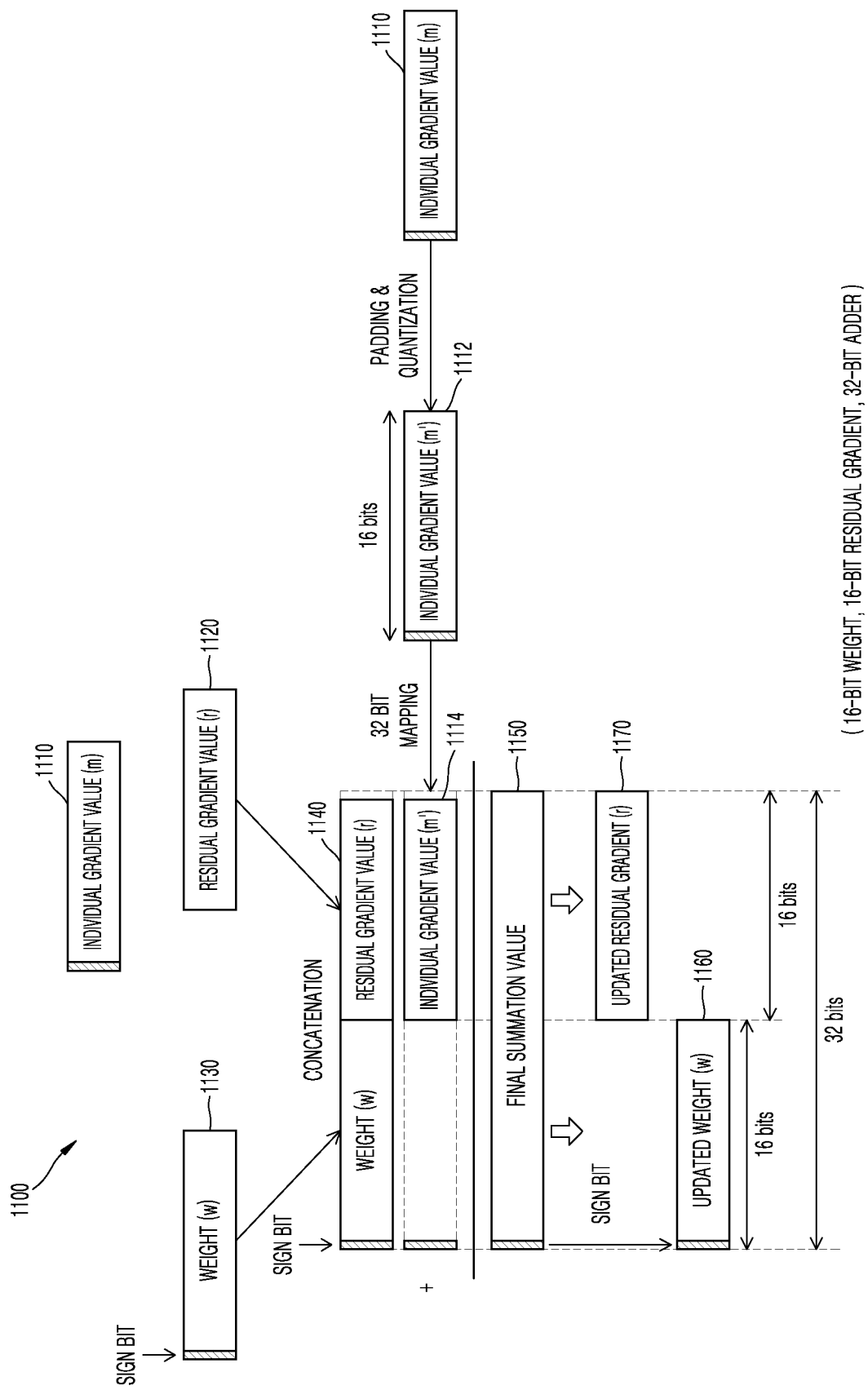
FIG. 11 is a diagram illustrating an example of updating a weight and a residual gradient value by using an adder according to one or more embodiments.

FIG. 11 is a diagram illustrating an example of updating a weight 1130 and a residual gradient value 1120 by using an adder 1100 according to an embodiment.

Hereinafter, redundant descriptions between FIGS. 9 and 11 will be omitted for convenience of description.

In FIG. 11, a process of summing a 16-bit individual gradient value 1110, the residual gradient value 1120, and the weight 1130 by using the 32-bit adder 1100 is shown.

Referring to FIG. 11, a neural network apparatus may tune the individual gradient value 1110 such that the bit number and bit digit of the individual gradient value 1110 correspond to the bit number and bit digit of the residual gradient value 1120. In an embodiment, the neural network apparatus may calculate a tuned individual gradient value 1112 by applying quantization and padding to the individual gradient value 1110. In an example, the neural network apparatus may correspond to the neural network apparatus 10 of FIG. 1, as a non-limiting example.

The neural network apparatus may calculate an intermediate concatenation value 1140 by concatenating the residual gradient value 1120 from which a sign bit is removed to the weight 1130. The MSB of the intermediate concatenation value 1140 may correspond to the sign bit of the weight 1030 and concatenated to the 16-bit weight 1130 and the 15-bit residual gradient value 1120 excluding the sign bit and thus, the 32-bit intermediate concatenation value 1140 may be calculated.

The neural network apparatus may map each of the intermediate concatenation value 1140 and the tuned individual gradient value 1112 to the adder 1100. For example, the neural network apparatus may map the intermediate concatenation value 1140 to the upper 31-bit digit of the adder 1100. In this case, the least significant bit digit of the adder 1100 may also be padded.

Further, the neural network apparatus may map the sign bit of the 16-bit tuned individual gradient value 1112 to the most significant bit digit of the adder 1100, and map the remaining 15 bits to the remaining 15-bit digit excluding the least significant bit of the adder 1100. In this case, the remaining upper 15-bit digit and the least significant bit digit of the adder 1100 may be padded excluding the MSB of the adder 1100.

The neural network apparatus may calculate a final summation value 1150 by summing the intermediate concatenation value 1140 and the mapped individual gradient value 1114. The neural network apparatus may obtain the updated weight 1160 and the updated residual gradient value 1170 from the final summation value 1150.

In an embodiment, the neural network apparatus may obtain the updated weight 1160 and the updated residual gradient value 1170 from the final summation value 1150 based on the bit digit of the weight 1130. For example, the neural network apparatus may obtain the bit position value of the final summation value 1150 corresponding to the bit digit of the weight 1130 as the updated weight 1160. The neural network apparatus may also obtain the bit digit value of the final summation value 1150 which does not correspond to the bit digit of the weight 1130 as the updated residual gradient value 1170.

At this time, the MSB of the updated weight 1160 may be a sign bit which is the MSB of the final summation value 1150. However, like the residual gradient value 1020 before being updated, the updated residual gradient value 1070 may not include the sign bit.

Figure 12:
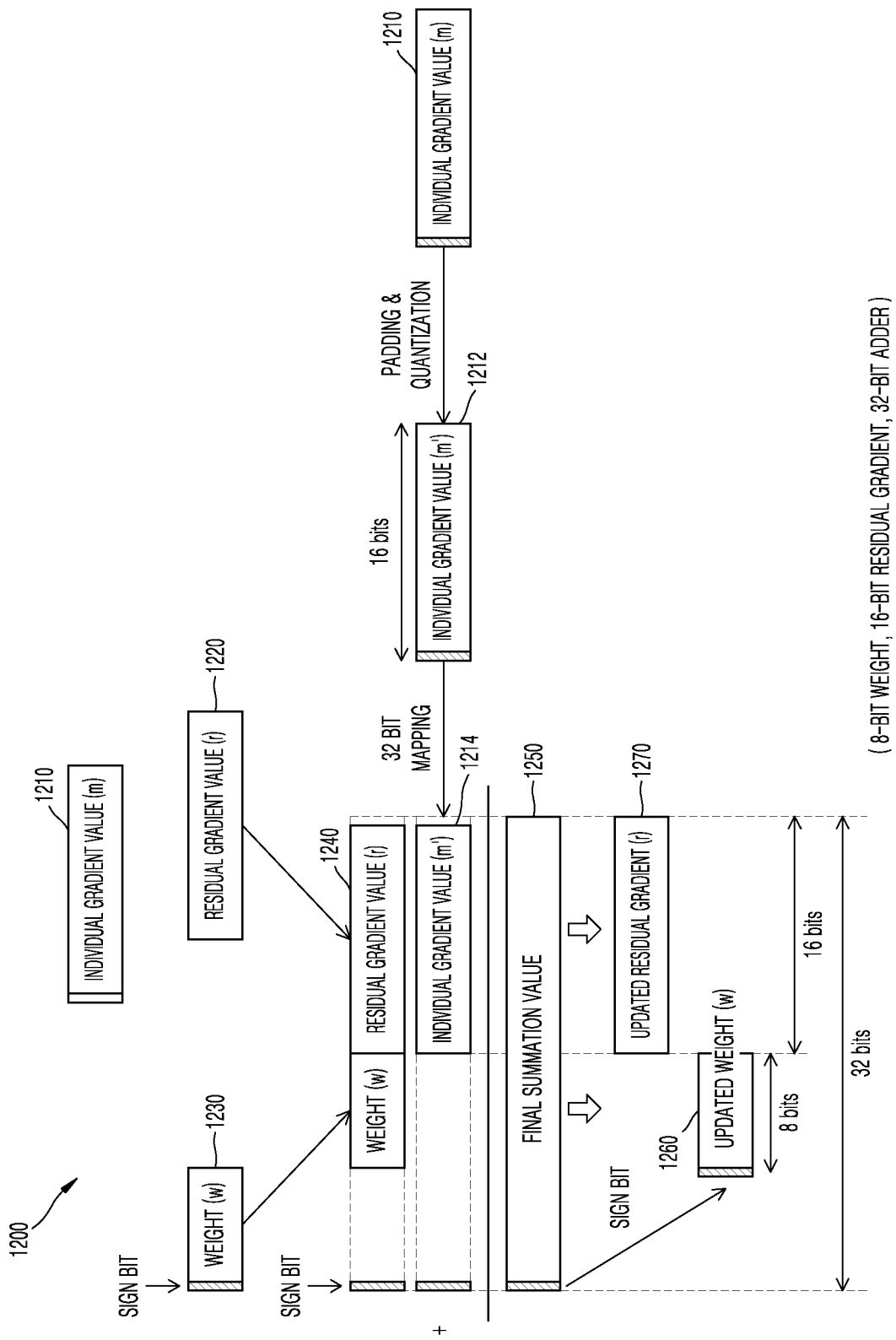
FIG. 12 is a diagram illustrating an example of updating a weight and a residual gradient value by using an adder according to one or more embodiments.

FIG. 12 is a diagram illustrating an example of updating a weight 1230 and a residual gradient value 1220 by using an adder 1200 according to an embodiment.

Hereinafter, redundant descriptions between FIGS. 10 and 12 will be omitted for convenience of description.

In FIG. 12, a process of summing the 16-bit individual gradient value 1210, the residual gradient value 1220, and the 8-bit weight 1230 by using the 32-bit adder 1200 is shown.

Referring to FIG. 12, a neural network apparatus may tune the individual gradient value 1210 such that the bit number and bit digit of the individual gradient value 1210 correspond to the bit number and bit digit of the residual gradient value 1220. In an embodiment, the neural network apparatus may calculate a tuned individual gradient value 1212 by applying quantization and padding to the individual gradient value 1210. In an example, the neural network apparatus may correspond to the neural network apparatus 10 of FIG. 1, as a non-limiting example.

The neural network apparatus may calculate an intermediate concatenation value 1240 by concatenating the residual gradient value 1220 from which a sign bit is removed to the weight 1230. Also, the neural network apparatus may map the intermediate concatenation value 1240 to the adder 1200.

In an embodiment, the sign bit which is the MSB of the weight 1230 may be mapped to the most significant bit digit of the adder 1200. Meanwhile, the weight 1130 of FIG. 11 is 16 bits, whereas the weight 1230 of FIG. 12 is 8 bits. In this case, the neural network apparatus may pad the intermediate concatenation value 1240 such that a value up to the most significant bit digit of the adder 1200 is present. Also, like FIG. 11, the least significant bit of the adder 1200 may also be padded.

Further, the neural network apparatus may map the sign bit of the 16-bit tuned individual gradient value 1212 to the most significant bit digit of the adder 1200 and map the remaining 15 bits to the remaining lower 15 bit digits of the adder 1200 excluding the least significant bit of the adder 1200. In this case, the remaining upper 15-bit digits and least significant bit digit of the adder 1200 may be padded excluding the MSB of the adder 1200.

The neural network apparatus may calculate a final summation value 1250 by summing the intermediate concatenation value 1240 and a mapped individual gradient value 1214. The neural network apparatus may obtain an updated weight 1260 and an updated residual gradient value 1270 from the final summation value 1250.

In an embodiment, the neural network apparatus may obtain the updated weight 1260 and the updated residual gradient value 1270 from the final summation value 1250 based on the bit digit of the weight 1230. For example, the neural network apparatus may obtain the bit digit value of the final summation value 1250 corresponding to the bit digit of the weight 1230 as the updated weight 1260. Also, the neural network apparatus may obtain the bit digit value of the final summation value 1250 which does not correspond to the bit digit of the weight 1230 as the updated residual gradient value 1270.

For example, the neural network apparatus may update the lower 16-bit digit value of the 32-bit final summation value 1250, which is a computation result of the 32-bit adder 1200, that does not correspond to the bit digit of the weight 1230 as the updated residual gradient value 1270. Meanwhile, the neural network apparatus may obtain the remaining bit digit value, excluding a padder (the upper 8-bit digit), from the upper 16-bit digit value of the 32-bit final summation value 1250 as the updated weight 1260.

The neural network apparatus may also obtain the sign bit which is the MSB of the final summation value 1250 and then replace the MSB of the updated weight 1260 with the sign bit of the final summation value 1250. However, like the residual gradient value 1220 before being updated, the updated residual gradient value 1270 may not include a sign bit.

Figure 13:
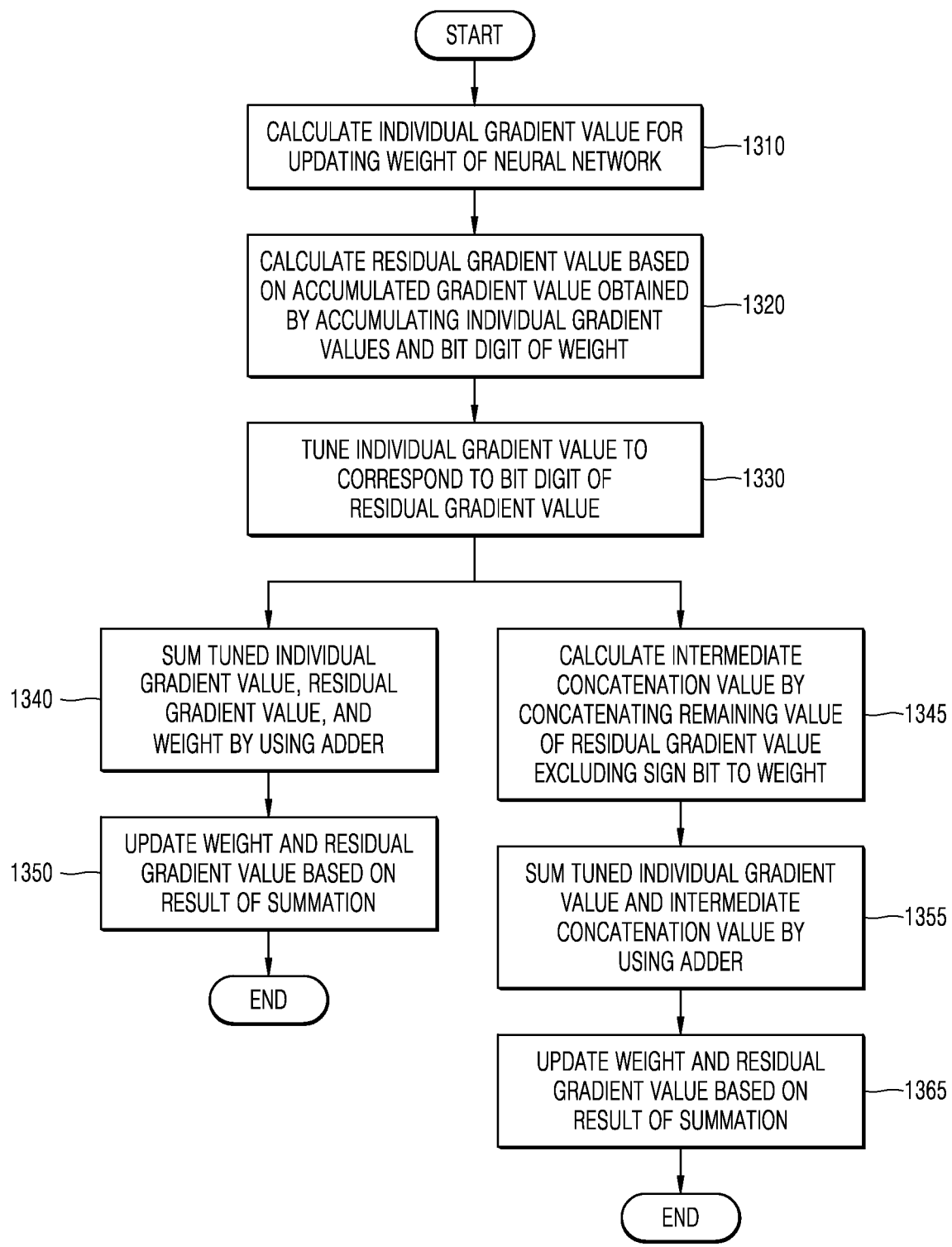
FIG. 13 is a flowchart illustrating a method of processing parameters in a neural network that uses a low-precision number system according to one or more embodiments.

FIG. 13 is a flowchart illustrating a method of processing parameters in a neural network that uses a low-precision number system according to an embodiment.

Referring to FIG. 13, in operation 1310, a neural network apparatus may calculate an individual gradient value for updating a weight of the neural network.

The neural network apparatus may calculate the individual gradient value for the weight assigned to the connection relationship between nodes included in the neural network. The individual gradient value may be a value calculated to update the weight. As described above with reference to FIG. 4, an optimizer of the neural network apparatus may calculate the individual gradient value by using a gradient descent method, a momentum method, and the like.

In operation 1320, the neural network apparatus may calculate a residual gradient value based on an accumulated gradient value obtained by accumulating the individual gradient values and the bit digit of the weight. In an example, the neural network apparatus may correspond to the neural network apparatus 10 of FIG. 1, as a non-limiting example.

The neural network apparatus may accumulate individual gradient values in an accumulation buffer. In the neural network that uses the low-precision number system, the neural network apparatus may accumulate the individual gradient value up to a magnitude that may affect the weight such that the individual gradient value is not disregarded in a process of updating of the weight.

When the accumulated gradient value of the accumulation buffer is equal to or greater than a threshold value, the neural network apparatus may determine a part of the accumulated gradient value that may be summed with the bit digit of the weight as an effective gradient value. The neural network apparatus may calculate the residual gradient value by subtracting the effective gradient value from the accumulated gradient value.

In operation 1330, the neural network apparatus may tune the individual gradient value to correspond to the bit digit of the residual gradient value.

In an embodiment, the neural network apparatus may tune the individual gradient value to correspond to the bit number and bit digit of the residual gradient value by quantizing and padding the individual gradient value.

Specifically, the neural network apparatus may quantize the individual gradient value such that a value of the individual gradient value less than the least significant bit digit of the residual gradient value is omitted. The neural network apparatus may also pad the quantized individual gradient value such that a value up to a bit digit corresponding to the most significant bit digit of the residual gradient value is present.

In an embodiment, after operation 1330, operations 1340 and 1350 may proceed.

In operation 1340, the neural network apparatus may sum the tuned individual gradient value, the residual gradient value, and the weight by using an adder.

The neural network apparatus may calculate an intermediate summation value by summing the tuned individual gradient value and the residual gradient value. Since both the tuned individual gradient value and the residual gradient value may include sign bits in the Most Significant Bit (MSB), the neural network apparatus may calculate the intermediate summation value of the tuned individual gradient value and the residual gradient value in consideration of the sign bits of the two values.

The neural network apparatus may also calculate a final summation value by summing the intermediate summation value and the weight.

In operation 1350, the neural network apparatus may update the weight and the residual gradient value based on a result of the summation.

In an embodiment, the neural network apparatus may obtain an updated weight and an updated residual gradient value from the final summation value based on the bit digit of the weight. For example, the neural network apparatus may obtain the bit digit value of the final summation value corresponding to the bit digit of the weight as the updated weight. The neural network apparatus may also obtain the bit digit value of the final summation value that does not correspond to the bit digit of the weight as the updated residual gradient value.

At this time, the MSB of the updated weight may be a sign bit which is the MSB of the final summation value. The neural network apparatus may also obtain the sign bit of the final summation value and may add the obtained sign bit to the updated residual gradient value such that the obtained sign bit is the MSB of the updated residual gradient value.

In another embodiment, after operation 1330, operations 1345, 1355, and 1365 may be performed.

In operation 1345, the neural network apparatus may calculate an intermediate concatenation value by concatenating the remaining value of the residual gradient value excluding the sign bit to the weight. The MSB of the intermediate concatenation value may correspond to the sign bit of the weight.

In operation 1355, the neural network apparatus may sum the tuned individual gradient value and the intermediate concatenation value by using the adder.

Since both the tuned individual gradient value and the intermediate concatenation value may include sign bits in the Most Significant Bit (MSB), the neural network apparatus may calculate the intermediate summation value of the tuned individual gradient value and the intermediate concatenation value in consideration of the sign bits of the two values.

In operation 1365, the neural network apparatus may update the weight and the residual gradient value based on a result of updating the weight and the residual gradient value based on a result of the summation.

In an embodiment, the neural network apparatus may obtain the updated weight and the updated residual gradient value from the final summation value based on the bit digit of the weight. For example, the neural network apparatus may obtain the bit digit value of the final summation value corresponding to the bit digit of the weight as the updated weight. The neural network apparatus may also obtain the bit digit value of the final summation value that does not correspond to the bit digit of the weight as the updated residual gradient value.

At this time, the MSB of the updated weight may be a sign bit which is the MSB of the final summation value. However, like the residual gradient value before updated, the updated residual gradient value may not include the sign bit. That is, the neural network apparatus may not add the sign bit of the final summation value to the updated residual gradient value.

Figure 14:
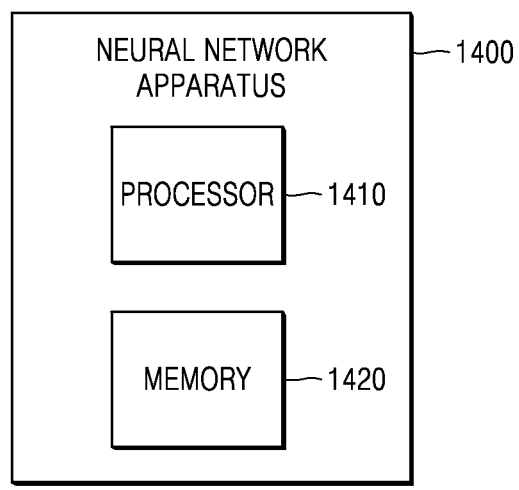
FIG. 14 is a block diagram showing a hardware configuration of a neural network apparatus according to an embodiment.

FIG. 14 is a block diagram showing a hardware configuration of a neural network apparatus 1400 according to an embodiment.

Referring to FIG. 14, the neural network apparatus 1400 may include at least one processor 1410 and memory 1420. Only components related to the present embodiment are shown in the neural network apparatus 1400 shown in FIG. 14. Therefore, in various examples the neural network apparatus 1400 may further include components other than the components shown in FIG. 14. For example, the neural network apparatus 1400 may further include a sensor module, a communication module, and an interface, etc. and may correspond with the neural network apparatus of FIG. 1, neural network apparatuses that perform operations of neural network apparatus 10, and/or neural network inference apparatus 20.

The neural network apparatus 1400 may be representative of, or included in, at least one of a home appliance, a mobile computing device, and a server, or may be connected to at least one of the home appliance, the mobile computing device, and the server by wired or wirelessly. The neural network apparatus 1400 may also be implemented by a combination of a device and a server. A device that receives a user input and a server that trains a neural network may exist separately, in non-limiting examples, and thus inference may be performed through communication between the device and the server. Inference may be performed in a single device, but is not limited to the above example.

The processor 1410 may be representative of one or more processors. For example, the at least one processor 1410 may be implemented as an array of logic gates, and may be implemented as a combination of a general purpose microprocessor and a memory in which a program executable in the microprocessor is stored. For example, the at least one processor 1410 may be a central processing unit (CPU), a graphics processing unit (GPU), a hardware accelerator, or the like.

The processor 1410 may operate in order to control the neural network apparatus 1400. For example, the processor 1410 may generally control the neural network apparatus 1400 by executing computer readable instructions stored in the memory 1420 included in the neural network apparatus 1400. The processor 1410 may also perform functions of the neural network apparatus 1400 in parallel by executing programs and instructions stored in the memory 1420.

The processor 1410 may perform some or all control operations an implementations of each of nodes included in layers of the neural network. For example, the processor 1410 may perform a neural network operation or a matrix operation by using activation values and weights as discussed herein.

The processor 1410 may control and implement a series of processes for processing parameters in a neural network that uses the low-precision number system described with reference to FIGS. 1 to 13 above.

The memory 1420 is hardware storing various pieces of data processed in the neural network apparatus 1400. For example, the memory 1420 may store data processed and data to be processed by the neural network apparatus 1400. The memory 1420 may also store applications, drivers, etc., to be driven by the neural network apparatus 1400. The memory 1420 may be a random access memory (RAM), a read-only memory (ROM), an electrically erasable programmable read-only memory (EEPROM), a dynamic random access memory (DRAM) ROM, Blu-ray or other optical disk storage, hard disk drive (HDD), solid state drive (SSD), or flash memory as non-limiting examples.

The memory 1420 may further include a built-in memory shared by the processor 1410 included in the neural network apparatus 1400 or a plurality of built-in memories supporting the processor 1410.

Figure 15:
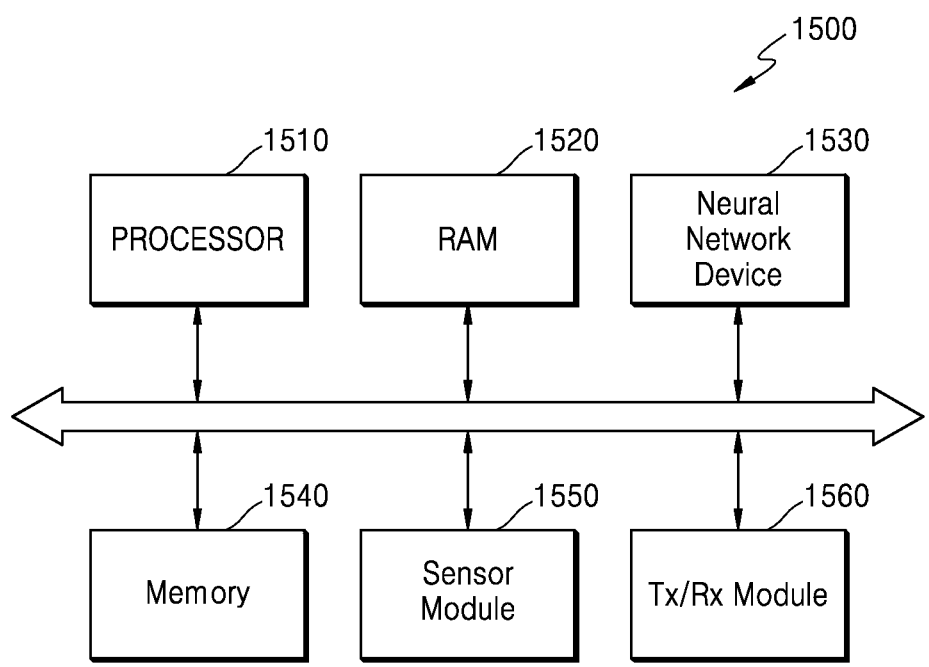
FIG. 15 is a block diagram of an electronic system according to one or more embodiments.

FIG. 15 is a block diagram of an electronic system 1500 according to one or more embodiments.

Referring to FIG. 15, the electronic system 1500 may extract effective information by analyzing input data in real time based on a neural network, determine a situation based on the extracted information, or control elements of the electronic device represented by or on which the electronic system 1500 is mounted. For example, the electronic system 1500 may be any one of, or applied to, or mounted in, robot devices such as drones, advanced drivers assistance system (ADAS), etc., smart TVs, smart phones, medical devices, mobile devices, image display devices, measuring devices, IoT devices, etc., as non-limiting electronic device examples.

The electronic system 1500 may include a processor 1510, RAM 1520, a neural network apparatus 1530, a memory 1540, a sensor module 1550, and a communication (TX/RX) module 1560. The electronic system 1500 may further include an input/output module, a security module, a power control device, etc. Some hardware components of the electronic system 1500 may be mounted on at least one semiconductor chip, for example. In examples, the neural network apparatus 1530 may include the above-described neural network apparatus 1400 of FIG. 14 or neural network dedicated hardware accelerator or an apparatus including the same. In another example, the electronic system 1500 corresponds to the neural network apparatus 1400 of FIG. 14 and the processor 1510 may be configured to perform any one, any combination, or all operations described herein with respect to FIGS. 1-14.

The processor 1510 may control some or all operations of the electronic system 1500. The processor 1510 may include one processor core (Single Core), or a plurality of processor cores (Multi-Core). The processor 1510 may process or execute instructions and programs and/or data stored in the memory 1540. In an embodiment, the processor 1510 may control implementations of the neural network apparatus 1530 by executing the instructions stored in the memory 1540. The processor 1510 may also be implemented by a CPU, a GPU, an AP, etc.

The RAM 1520 may temporarily store programs, data, or instructions. For example, the programs and/or data stored in the memory 1540 may be temporarily stored in the RAM 1520 according to a booting code or the control of the processor 1510. The RAM 1520 may be implemented by memory such as dynamic RAM (DRAM) or static RAM (SRAM), etc. The ram may also temporarily store initial or interim parameters as during any of the training operations described herein and performed by the system 1500 in one or more examples.

The neural network apparatus 1530 may perform an operation of a neural network based on the received input data, and generate an information signal based on a result of the operation, e.g. using any one, any combination, or all neural networks described herein. Such neural networks may include CNNs, RNNs, deep belief networks, restricted Boltzman machines, etc., but the present disclosure is not limited thereto. The neural network apparatus 1530 is hardware that drives the above-described neural network for classification and may correspond to the neural network dedicated hardware accelerator.

The information signal may include one of various types of recognition signals such as voice recognition signal, object recognition signal, image recognition signal, biometric information recognition signal, etc. For example, the neural network apparatus 1530 may receive frame data included in a video stream as input data, and generate from frame data a recognition signal for an object included in an image indicated by the frame data and operate or not operate based on the recognition, or lock or unlock access to the corresponding device. However, the present disclosure is not limited thereto, and the neural network apparatus 1530 may receive various types of input data and generate a recognition or classification signal according to the input data, according to the type of an electronic device on which the electronic system 1500 is represented by or mounted in.

The memory 1540 is a storage for storing data, such as, an operating system (OS), various programs, and various pieces of data. In an embodiment, the memory 1540 may store intermediate results generated in an operation performing process of the neural network apparatus 1530, such as, an output feature map, as an output feature list or an outer feature matrix. In an embodiment, the memory 1540 may store a compressed output feature map. Furthermore, the memory 1540 may store quantized neural network data, such as, parameters, weight maps, or a weight list, which are used by the neural network apparatus 1530, as discussed herein.

The memory 1540 may be DRAM, but the present disclosure is not limited thereto. The memory 1540 may include at least one of a volatile memory and a nonvolatile memory. The nonvolatile memory may include ROM, PROM, EPROM, EEPROM, flash memory, PRAM, MRAM, RRAM, FRAM, etc. The volatile memory may include DRAM, SRAM, SDRAM, PRAM, MRAM, RRAM, FeRAM, etc. In an embodiment, the memory 1540 may include at least one of HDD, SSD, CF, SD, Micro-SD, Mini-SD, xD, and Memory Stick.

The sensor module 1550 may collect information about the periphery of the electronic device represented by, or on which the electronic system 1500 is mounted. The sensor module 1550 may sense or receive a signal, such as, an image signal, a voice signal, a magnetic signal, a biometric signal, a touch signal, etc., from the outside of the electronic device, and convert a sensed or received signal to data. To this end, the sensor module 1550 may include at least one of various types of sensing devices, such as microphones, imaging devices, image sensors, light detection and ranging (LIDAR) sensors, ultrasonic sensors, infrared sensors, biosensors, touch sensors, etc.

The sensor module 1550 may provide the neural network apparatus 1530 with the converted data as input data. For example, the sensor module 1550 may include an image sensor, and may generate a video stream by photographing the external environment of the electronic device, and provide the neural network apparatus 1530 with consecutive data frames of the video stream in order as input data. However, the present disclosure is not limited thereto, and the sensor module 1550 may provide various types of data to the neural network apparatus 1530.

The communication module 1560 may include various wired or wireless interfaces capable of communicating with external devices. For example the communication module 1560 may include a local area network (LAN), wireless local area network (WLAN) such as wireless fidelity (Wi-Fi), wireless personal area network (WPAN) such as Bluetooth, wireless universal serial bus (USB), ZigBee, near field communication (NFC), radio-frequency identification (RFID), power line communication (PLC), or a communication interface capable of connecting to a mobile cellular network such as 3rd generation (3G), 4th generation (4G), long-term evolution (LTE), etc.

The neural network apparatus 10, neural network inference apparatus 20, neural network apparatus 1400, processor 1410, memory 1420, electronic system 1500, processor 1510, RAM 1520, memory 1540, sensor module 1550, Tx/Rx module 1560, and optimizer in FIGS. 1-15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations in FIGS. 1-15 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
generating one or more respective individual gradient values for training a neural network by updating a weight of the neural network;
tuning the one or more respective individual gradient values to correspond to bit digits of a residual gradient value, where each respective individual gradient value has respective bit digits;
generating an intermediate summation value using the tuned one or more respective individual gradient values and the residual gradient value;
summing the weight and the intermediate summation value;
generating an updated residual gradient value by updating the residual gradient value to be a portion of the intermediate summation value not overlapping bit digits of the weight and storing the updated residual gradient value in an accumulation buffer;
generating an updated weight by updating the weight with a portion of the intermediate summation value overlapping the bit digits of the weight, in response to the intermediate summation value overlapping bit digits of the weight, to train the neural network; and
generating a trained neural network by training the neural network using the updated residual gradient value and updated weight,
wherein the residual gradient value is dependent on an accumulating of one or more previous individual gradient values for updating the weight in a previous time.

2. The method of claim 1, wherein the updating of the residual gradient value comprises:
determining an effective gradient value dependent on the result of the summing, where the effective gradient value has a value divisible by the least significant bit digit of the weight; and
updating the residual gradient value by subtracting the effective gradient value from the result of the summing.

3. The method of claim 1, wherein the tuning of the one or more respective individual gradient values comprises:
quantizing each of the one or more respective individual gradient values, including omitting respective values of the one or more respective individual gradient values that are less than a least significant bit digit of the residual gradient value; and
padding each of the quantized one or more respective individual gradient values, wherein a value up to a bit digit corresponding to a most significant bit digit of the residual gradient value is present in each padded quantized one or more respective individual gradient values.

4. The method of claim 1, wherein the summing comprises:
mapping the tuned one or more respective individual gradient values and the residual gradient value based on a set bit number, and calculating the intermediate summation value based on the mapped tuned one or more respective individual gradient values and the mapped residual gradient value; and
mapping the weight based on the set bit number and summing the intermediate summation value and the weight.

5. The method of claim 1, wherein the summing comprises:
padding the tuned one or more respective individual gradient values, the residual gradient value, and the weight; and
summing the padded weight and the padded intermediate summation value of the padded tuned one or more respective individual gradient values and the padded residual gradient value.

6. The method of claim 1,
wherein the updating of the weight comprises updating a bit digit value of a portion of the result of the summing, corresponding to the bit digit representing the weight, to the updated weight, and
wherein the updating of the residual gradient value comprises updating a bit digit value of a remaining portion of the result of the summing, not corresponding to the bit digit representing the weight, to the residual gradient value.

7. The method of claim 1, further comprising:
obtaining a sign bit that is a Most Significant Bit of the result of the summing; and
adding the obtained sign bit such that the obtained sign bit is a Most Significant Bit of the updated weight and/or the updated residual gradient value.

8. A non-transitory computer-readable recording medium having recorded thereon computer readable instructions, which, when executed by one or more processors, performs the method of claim 1.

9. A processor-implemented neural network method, the method comprising:
generating one or more respective individual gradient values for training a neural network by updating a weight of the neural network;
tuning the one or more respective individual gradient values to correspond to bit digits of a residual gradient value, where each respective bit individual gradient value has respective bit digits;
generate an intermediate concatenation value by concatenating a remaining value of the residual gradient value, excluding a sign bit, to the weight;
summing the tuned one or more respective individual gradient values and the intermediate concatenation value;
generate an updated residual gradient value by updating the residual gradient value to be a portion of the intermediate concatenation value not overlapping bit digits of the weight;
generate an updated weight by updating the weight with a portion of the intermediate concatenation value overlapping the bit digits of the weight, in response to a summation of the tuned one or more respective individual gradient values overlapping bit digits of the weight, to train the neural network; and
generating a trained neural network by training the neural network using the updated residual gradient value and updated weight,
wherein the residual gradient value is dependent on an accumulating of one or more previous individual gradient values for updating the weight in a previous time.

10. The method of claim 9, wherein the updating of the residual gradient value comprises:

determining an effective gradient value dependent on the result of the summing, where the effective gradient value has a value divisible by the least significant bit digit of the weight; and updating the residual gradient value by subtracting the effective gradient value from the result of the summing.

11. The method of claim 9, wherein the tuning of the one or more respective individual gradient values comprises:

quantizing each of the one or more respective individual gradient values, including omitting respective values of the one or more respective individual gradient values that are less than a least significant bit digit of the residual gradient value; and padding each of the quantized one or more respective individual gradient values, wherein a value up to a bit digit corresponding to a most significant bit digit of the residual gradient value is present in each padded quantized one or more respective individual gradient values.

12. The method of claim 9, wherein the summing comprises:

mapping the tuned one or more respective individual gradient values and the intermediate concatenation value based on a set bit number, and summing the mapped tuned one or more respective individual gradient values and the mapped intermediate concatenation value.

13. A non-transitory computer-readable recording medium having recorded thereon computer readable instructions, which, when executed by one or more processors, causes the one or more processors to perform the method of claim 9.

14. The method of claim 9, wherein the summing comprises:

padding the tuned one or more respective individual gradient values and the intermediate concatenation value; and summing the padded tuned one or more respective individual gradient values and the padded intermediate concatenation value.

15. The method of claim 9, wherein the updating of the weight comprises updating a bit digit value of a portion of the result of the summing, corresponding to the bit digit representing the weight, to the updated weight, and wherein the updating of the residual gradient value comprises updating a bit digit value of a remaining portion of the result of the summing, not corresponding to the bit digit representing the weight, to the residual gradient value.

16. The method of claim 9, further comprising:

obtaining a sign bit that is a Most Significant Bit of the result of the summing; and adding the obtained sign bit such that the obtained sign bit is a Most Significant Bit of the updated weight and/or the updated residual gradient value.

17. A neural network apparatus, the apparatus comprising:

one or more processors configured to:

generate respective individual gradient values to train a neural network by updating a weight of the neural network;

generate a residual gradient value based on an accumulated gradient value obtained by accumulating the respective individual gradient values and a bit digit representing the weight;

tune the respective individual gradient values to correspond to a bit digit representing the residual gradient value;

generate an intermediate summation value of the tuned individual gradient value and the residual gradient value;

sum the weight and the intermediate summation value;

generate an updated weight by updating the weight with a portion of the intermediate summation value overlapping bit digits of the weight, in response to the intermediate summation value overlapping bit digits of the weight, to train the neural network;

generate an updated residual gradient value by updating the residual gradient value to be a portion of the intermediate summation value not overlapping the bit digits of the weight and store the updated residual gradient value in an accumulation buffer; and generate a trained neural network by training the neural network using the updated weight and the updated residual gradient value.

18. A neural network apparatus, the apparatus comprising:

one or more processors configured to:

generate one or more respective individual gradient values for training a neural network by updating a weight of the neural network;

tune the one or more respective individual gradient to correspond to bit digits of a residual gradient value, where each respective individual gradient value has respective bit digits;

generate an intermediate concatenation value by concatenating a remaining value of the residual gradient value, excluding a sign bit, to the weight, sum the tuned one or more respective individual gradient values and the intermediate concatenation value;

generate an updated residual gradient value by updating the residual gradient value to be a portion of the intermediate concatenation value not overlapping bit digits of the weight and store the updated residual gradient value in an accumulation buffer;

generate an updated weight by updating the weight with a portion of the intermediate concatenation value overlapping the bit digits of the weight, in response to a summation of the tuned one or more respective individual gradient values overlapping bit digits of the weight; and generate a trained neural network by training the neural network using the updated residual gradient value and updated weight;

wherein the residual gradient value is dependent on an accumulating of one or more previous individual gradient values for updating the weight in a previous time.

19. The apparatus of claim 18, further comprising a memory storing instructions, which when executed by the one or more processors, configure the one or more processors to perform the calculation of the one or more respective individual gradient values, the tuning of the one or more respective individual gradient values, the concatenating of the remaining value, the summing, the updating of the residual gradient value, and the updating of the weight.

20. A neural network apparatus, the apparatus comprising:

one or more processors configured to:

generate one or more respective individual gradient values for training a neural network by updating a weight of the neural network;

tune the one or more respective individual gradient values to correspond to bit digits of a residual gradient value, where respective individual gradient value has respective big-bit digits;

generate an intermediate summation value using the tuned one or more respective individual gradient values and the residual gradient value;

generate an updated residual gradient value by updating the residual gradient value to be a portion of the intermediate summation value not overlapping bit digits of the weight and store the updated residual gradient value in an accumulation buffer, sum the weight and the intermediate summation value;

generate an updated weight by updating the weight with a portion of the intermediate summation value overlapping the bit digits of the weight, in response to the intermediate summation value overlapping bit digits of the weight, to train the neural network; and generate a trained neural network by training the neural network using the updated residual gradient value and updated weight, wherein the residual gradient value is dependent on an accumulating of one or more previous individual gradient values for updating the weight in a previous time.

21. The apparatus of claim 20, further comprising a memory storing instructions, which when executed by the one or more processors, configure the one or more processors to perform the calculation of the one or more respective individual gradient values, the tuning of the one or more respective individual gradient values, the summing, the updating of the residual gradient value, and the updating of the weight.

* * * * *